United States Patent
Park et al.

(10) Patent No.: US 10,051,586 B2
(45) Date of Patent: Aug. 14, 2018

(54) TERMINAL SYNCHRONIZATION METHOD AND APPARATUS FOR USE IN WIRELESS COMMUNICATION NETWORK

(71) Applicants: Samsung Electronics Co. Ltd., Suwon-si, Gyeonggi-do (KR); RESEARCH & BUSINESS FOUNDATION OF SUNGKYUNKWAN UNIVERSITY, Suwon-si, Gyeonggi-do (KR)

(72) Inventors: Seunghoon Park, Seoul (KR); Hyungjin Choi, Seoul (KR); Kyunghoon Won, Suwon-si (KR); Kyunghoon Lee, Seoul (KR); Kyungkyu Kim, Suwon-si (KR); Daegyun Kim, Seongnam-si (KR); Chiwoo Lim, Suwon-si (KR)

(73) Assignees: Samsung Electronics Co., Ltd., Suwon-si (KR); Research & Business Foundation of Sungkyunkwan University, Suwon-si (KR)

( * ) Notice: Subject to any disclaimer, the term of this patent is extended or adjusted under 35 U.S.C. 154(b) by 265 days.

(21) Appl. No.: 13/922,056

(22) Filed: Jun. 19, 2013

(65) Prior Publication Data
US 2013/0336307 A1    Dec. 19, 2013

(30) Foreign Application Priority Data

Jun. 19, 2012  (KR) .................. 10-2012-0065756

(51) Int. Cl.
*H04W 56/00* (2009.01)
(52) U.S. Cl.
CPC ......... *H04W 56/00* (2013.01); *H04W 56/002* (2013.01)

(58) Field of Classification Search
CPC .................. H04W 56/00; H04W 56/002
See application file for complete search history.

(56) References Cited

U.S. PATENT DOCUMENTS 4,638,479 A * 1/1987 Alexis ................ H04W 16/10
                                                            370/344
5,898,902 A * 4/1999 Tuzov ................. H04B 7/2125
                                                            455/13.1
(Continued)

FOREIGN PATENT DOCUMENTS

CN           101371613 A        2/2009
WO         2010-108549 A1      9/2010
(Continued)

*Primary Examiner* — Noel R Beharry
*Assistant Examiner* — Rodrick Mak
(74) *Attorney, Agent, or Firm* — Jefferson IP Law, LLP

(57) ABSTRACT

A terminal synchronization method and apparatus for use in a wireless communication system are provided. A synchronization method includes configuring, at the terminal, a synchronization signal reference time depending on whether a synchronization signal is received in an initial observation period as long as at least two frames, monitoring to receive the synchronization signal in an alternation period of a transmission period and a reception period, the alternation period following the initial observation period, updating the reference time depending on whether the synchronization signal is received in the reception period, transmitting the synchronization signal at the updated reference time in the transmission period, and updating the reference time depending on whether the synchronization signal is received in a dedicated observation period following the alternation period. The synchronization apparatus and method are advantageous in that synchronization is obtained without assistance of a base station, an Access Point (AP), etc.

17 Claims, 29 Drawing Sheets

(56) References Cited

U.S. PATENT DOCUMENTS

| | | | | |
|---|---|---|---|---|
| 6,590,891 B1* | 7/2003 | Jacquet | H04B 7/269 | 370/350 |
| 6,813,351 B1* | 11/2004 | Tahernezhadi | H04M 9/082 | 370/286 |
| 6,975,652 B1* | 12/2005 | Mannette | H04J 3/0664 | 370/503 |
| 7,076,212 B1* | 7/2006 | Doi | H04L 7/042 | 370/335 |
| 7,801,085 B1* | 9/2010 | Chen | H04B 1/712 | 370/328 |
| 8,743,843 B2* | 6/2014 | Laroia | H04L 5/0035 | 370/336 |
| 9,369,943 B2 | 6/2016 | Li et al. | | |
| 9,648,573 B2* | 5/2017 | Siomina | H04W 56/001 | |
| 9,684,287 B2* | 6/2017 | Tanaka | G05B 13/021 | |
| 2001/0055968 A1* | 12/2001 | Yoshida | H04W 52/362 | 455/436 |
| 2002/0111171 A1* | 8/2002 | Boesch | G01S 5/0027 | 455/456.5 |
| 2004/0052319 A1* | 3/2004 | Wakamatsu | H04L 27/2656 | 375/343 |
| 2004/0151261 A1* | 8/2004 | Du | H04B 1/7073 | 375/343 |
| 2004/0223515 A1 | 11/2004 | Rygielski et al. | | |
| 2004/0248602 A1* | 12/2004 | Demir | H04B 1/70735 | 455/502 |
| 2005/0003842 A1* | 1/2005 | Harju | H04W 24/00 | 455/502 |
| 2009/0003307 A1* | 1/2009 | Yang et al. | 370/350 | |
| 2009/0122782 A1* | 5/2009 | Horn | H04W 56/001 | 370/350 |
| 2011/0026422 A1* | 2/2011 | Ma et al. | 370/252 | |
| 2011/0275382 A1 | 11/2011 | Hakola et al. | | |
| 2011/0292786 A1* | 12/2011 | Haessler et al. | 370/216 | |
| 2012/0155585 A1* | 6/2012 | Trotta | H04J 3/0614 | 375/354 |
| 2012/0195328 A1* | 8/2012 | Otsuka et al. | 370/478 | |
| 2012/0201195 A1* | 8/2012 | Rausch et al. | 370/328 | |
| 2013/0029716 A1 | 1/2013 | Lee et al. | | |
| 2013/0114512 A1* | 5/2013 | Yamamoto | 370/328 | |
| 2013/0177030 A1* | 7/2013 | Kim et al. | 370/504 | |
| 2013/0208694 A1 | 8/2013 | Park et al. | | |

FOREIGN PATENT DOCUMENTS

| | | |
|---|---|---|
| WO | 2011-129575 A2 | 10/2011 |
| WO | 2012-053857 A2 | 4/2012 |

* cited by examiner

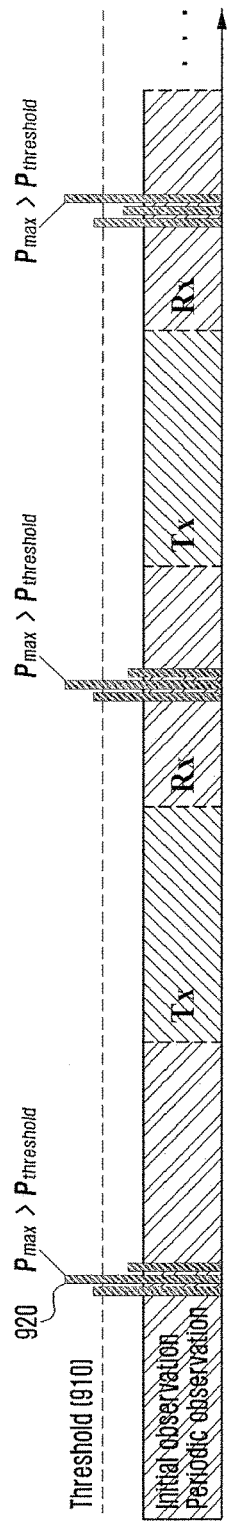

TERMINAL SYNCHRONIZATION METHOD AND APPARATUS FOR USE IN WIRELESS COMMUNICATION NETWORK

PRIORITY

This application claims the benefit under 35 U.S.C. § 119(a) of a Korean patent application filed on Jun. 19, 2012 in the Korean Intellectual Property Office and assigned Serial No. 10-2012-0065756, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd and Research & Business Foundation at Sungyunkwan University.

BACKGROUND OF THE INVENTION

1. Field of the Invention

The present invention relates to a terminal synchronization method and apparatus for use in a wireless communication system.

2. Description of the Related Art

A Device-to-Device (D2D) communication network is a communication network in which adjacent devices communicate with each other directly without assistance from legacy infrastructure elements such as a base station or an Access Point (AP). In a D2D environment, each node, such as a portable terminal, searches for another node that is physically close and establishes a communication session with the found node to transmit traffic. Due to its advantageous effect of mitigating traffic overload by distributing the traffic concentrated to the base station, the D2D communication network is considered as a key technology of the 4th Generation (4G) and beyond system. For this reason, standardization organizations, such as the 3rd Generation Partnership Project (3GPP) and Institute of Electrical and Electronics Engineers (IEEE), are interested in establishing a D2D communication standard based on Long Term Evolution-Advanced (LTE-A) or Wireless-Fidelity (Wi-Fi) technology, the companies are developing independent D2D communication technologies.

This specification defines a Global Synchronization method and apparatus for D2D communication network in detail. The distributed communication network implementations can be classified into a synchronous synchronization method for synchronizing the reference times of the terminals and an asynchronous synchronization method in which the terminals operate with independent time information without synchronization of the reference times. A drawback of the asynchronous method is low system efficiency. In response, the FlashLinQ system adopted by Qualcomm is a representative synchronous synchronization method to avoid the inefficiency of the synchronous synchronization method. In the FlashLinQ system, the synchronization among the distributed terminals is acquired with the synchronization signal from the legacy infrastructure such as a cellular communication system, a Digital Video Broadcasting system, a Global Positioning System (GPS), and the like. The FlashLinQ system is also assisted by base stations, for synchronization performance enhancement, as well as using the synchronization signal of the infrastructure. However, the FlashLinQ system performs the synchronization procedure among the terminals on the assumption of a control process in that the base station allocates extra slots for synchronization to the terminals. Accordingly, there are shortcomings in that the synchronization among the terminals is impossible without assistance of the base station and requires extra resource allocation for control and synchronization of the base station and exchange of control information. Furthermore, when the base stations are not synchronized, it is difficult to acquire synchronization among the terminals because the terminals have different reference times.

Qualcomm has devised the FlashLinQ based on an ad-hoc network in which the terminals communicate without access to an Access Point (AP).

FIG. 1 is a graph illustrating synchronization signal transmission timings of the FlashLinQ system according to the related art.

Referring to FIG. 1, the basic synchronization signal transmission/reception mechanism of the related art is structured in such a way of requesting, at each terminal, for configuration of a specific transmission period for broadband signal transmission to perform synchronization, allocating, at the base station, terminal specific-transmission period, and transmitting, at each terminal, signals at a terminal-specific period while receiving signals from other terminals out of the terminal-specific period. Each terminal transmits/receives terminal-specific timing synchronization signal according to the timings of FIG. 1 to exchange the timing information and thus the timing information of each terminal is adjusted continuously to acquire timing synchronization with other terminals.

The synchronization of FlashLinQ works on the assumption of the control procedure for the base station to allocate synchronization slots to the respective terminals for performing the synchronization among the terminals. Accordingly, there are shortcomings in that the synchronization among the terminals is impossible without assistance of the base station and requires extra resource allocation for control and synchronization of the base station and exchange of control information. Although FlashLinQ defines the procedure of synchronization among the terminal based on the synchronization times transmitted by the base stations having different reference times in the asynchronous network, it is difficult to acquire synchronization among the terminal accurately through the method of the related art. Accordingly, there is a need for an improved apparatus and method for providing global synchronization based on independent operations of the terminals without additional controls and assistance of the base station for global synchronization of the D2D communication network.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for synchronization among terminals without assistance of infrastructure such as base station and Access Point (AP).

Another aspect of the present invention is to provide a global synchronization method based on independent operations of the terminals without additional controls and assistance of the base station for global synchronization of the Device-to-Device (D2D) communication network. An exemplary global synchronization method of the present invention includes a frame structure for global synchronization of D2D communication network, a synchronization signal transmission/reception method, terminals' reference time configuration method for global synchronization, inter-group synchronization, and power efficiency enhancement method.

In accordance with an aspect of the present invention, a synchronization method of a terminal is provided. The method includes configuring a synchronization signal reference time depending on whether a synchronization signal is received in an initial observation period as long as at least to frames, monitoring to receive the synchronization signal in an alternation period of a transmission period and a reception period, the alternation period following the initial observation period, updating the reference time depending on whether the synchronization signal is received in the reception period, transmitting the synchronization signal at the updated reference time in the transmission period, and updating the reference time depending on whether the synchronization signal is received in a dedicated observation period following the alternation period.

In accordance with another aspect of the present invention, a terminal for performing synchronization is provided. The terminal includes a communication unit configured to transmit and receive synchronization signals, and a controller configured to control configuring a synchronization signal reference time depending on whether a synchronization signal is received in an initial observation period as long as at least to frames, monitoring to receive the synchronization signal in an alternation period of a transmission period and a reception period, the alternation period following the initial observation period, updating the reference time depending on whether the synchronization signal is received in the reception period, transmitting the synchronization signal at the updated reference time in the transmission period, and updating the reference time depending on whether the synchronization signal is received in a dedicated observation period following the alternation period.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 9A and 9B are diagrams illustrating operation patterns of a terminal for a non-synchronization signal-based procedure in a synchronization method according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
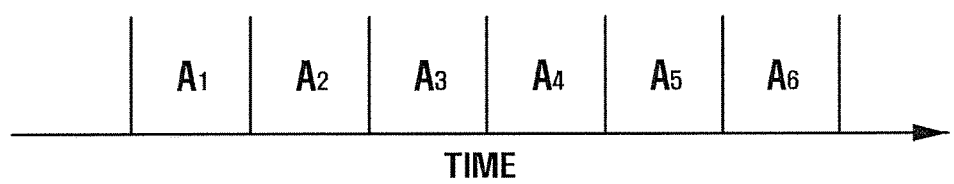
FIG. 1 is a graph illustrating synchronization signal transmission timings of the FlashLinQ system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted to for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some elements are exaggerated, omitted or simplified in the drawings and the elements may have sizes and/or shapes different from those shown in drawings, in practice. The same reference numbers are used throughout the drawings to refer to the same or like parts.

The terminal synchronization methods and apparatuses for use in a wireless communication according to exemplary embodiments of the present invention are described below with reference to the accompanying drawings.

Exemplary embodiments of the present invention propose a global synchronization method based on independent operations of terminals without control or additional assistance of a base station for global synchronization of a Device-to-Device (D2D) communication network. An exemplary method includes a frame structure for global synchronization of a D2D communication network, a synchronization signal transmission/reception method, a terminals' reference time configuration method for global synchronization, an inter-group synchronization, and a power efficiency enhancement method.

Figure 2:
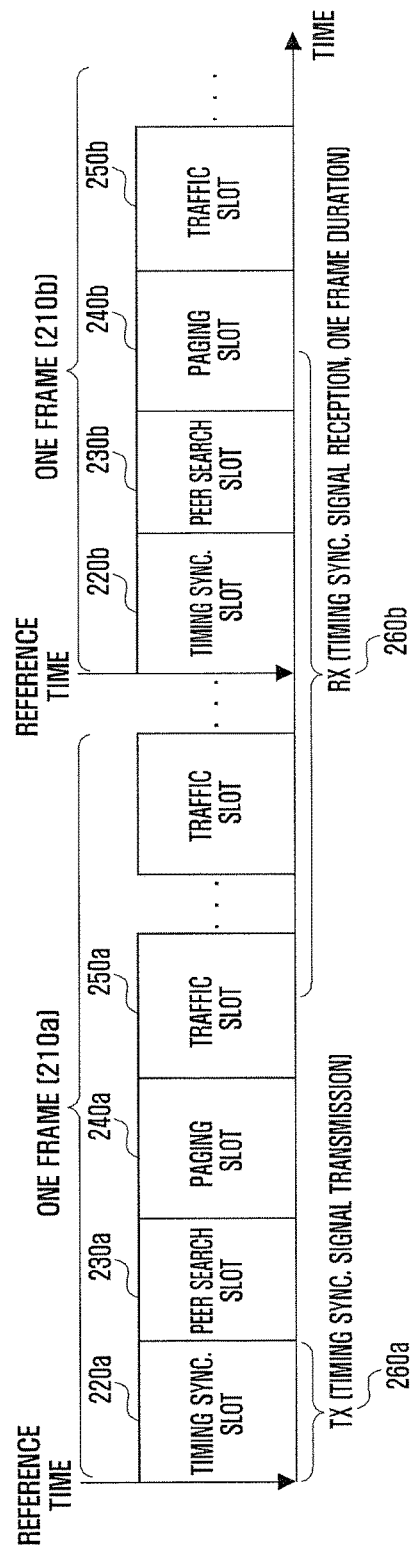
FIG. 2 is a diagram illustrating a frame structure for use in Device-to-Device (D2D) communication according to an exemplary embodiment of the present invention.

FIG. 2 is a diagram illustrating a frame structure for use in D2D communication according to an exemplary embodiment of the present invention.

Referring to FIG. 2, each frame 210a (or 210b) has a timing synchronization slot at the same position. Each frame also includes a peer search slot 230a (or 230b), a paging slot 240a (or 240b), and traffic slots 250a (250b).

This exemplary embodiment is directed to a global synchronization procedure being performed based on the timing synchronization slot 220a (or 220b) in the frame 210a (or 210b). Each terminal is capable of transmitting a synchronization signal at the timing synchronization slot 220a (220b) and receiving the synchronization signal transmitted by another terminal at a predetermined period corresponding to the timing synchronization slot 220a (or 220b). In the timing synchronization signal transmission period 260a, the terminal transmits its timing synchronization signal to neighbor terminals but does not receive any timing synchronization from other terminals. Meanwhile, in the timing synchronization reception monitoring period 260b, the terminal does not transmit its timing synchronization but receives the timing synchronization signal transmitted the neighbor terminals.

Figure 3:
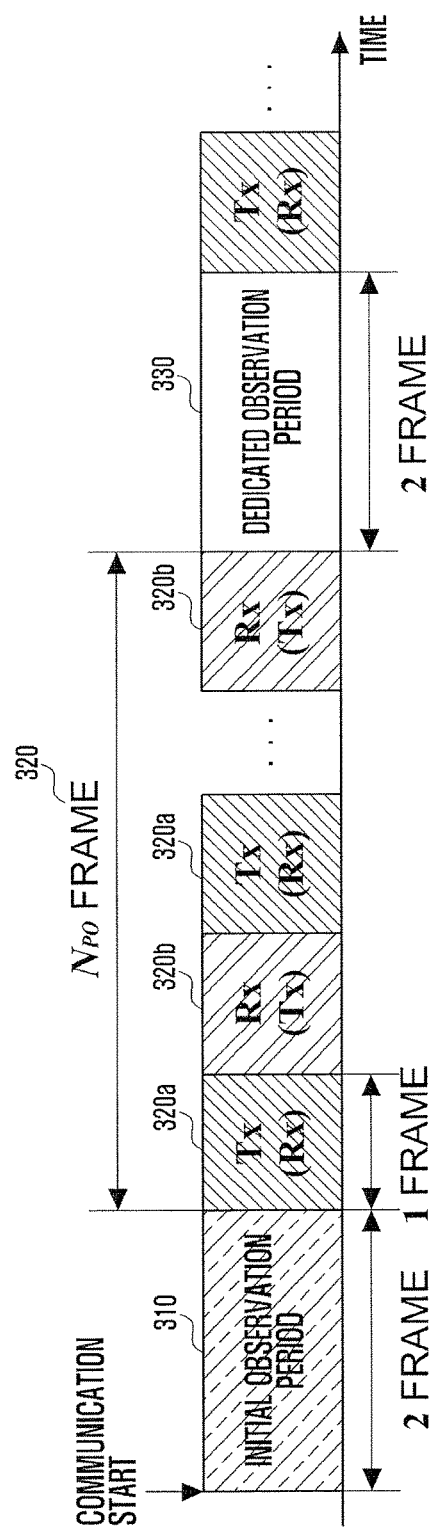
FIG. 3 is a diagram illustrating the operation timings of the terminal in unit of frame for acquiring global synchronization according to an exemplary embodiment of the present invention.

FIG. 3 is a diagram illustrating operation timings of a terminal in units of frames for acquiring global synchronization according to an exemplary embodiment of the present invention.

Referring to FIG. 3, at least two frames at the beginning of communication are allocated as initial observation period 310 for receiving a Global Synchronization Signal (GSS) or a synchronization signal of neighbor terminals. Afterward, the Transmission (Tx) period 320a and observation period (Rx) 320b appear alternately in the repetition period of $N_{PO}$ frames 320 for exchange of synchronization signals with other terminals. In order to adapt to the variation of the network due to the appearance, disappearance, and movement of terminals, a dedicated observation period 330 (e.g., at least two frames) allowing for receiving but not transmitting the synchronization signal appears periodically.

Figure 4A:
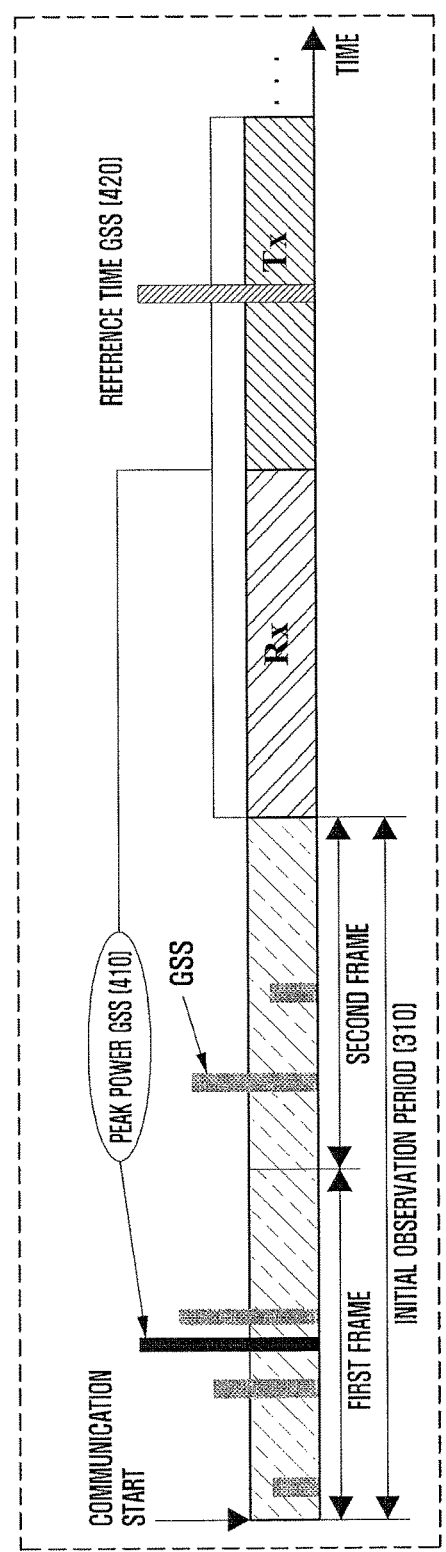
FIGS. 4A to 4C are diagrams illustrating operations of a terminal at respective operation periods of in a frame structure of FIG. 3 according to an exemplary embodiment of the present invention.
Figure 4B:
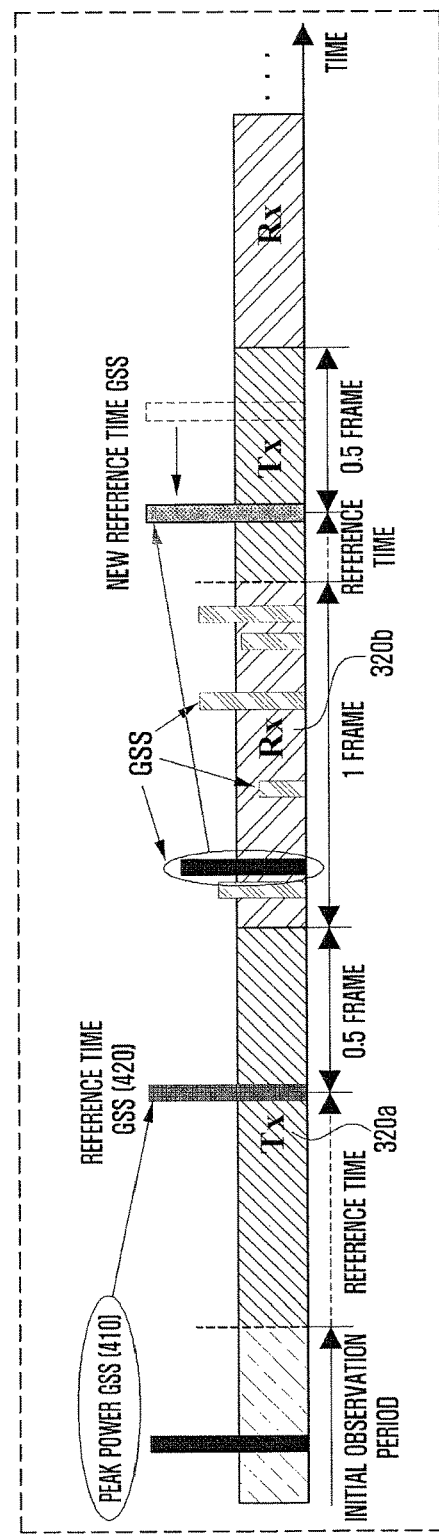
Figure 4C:
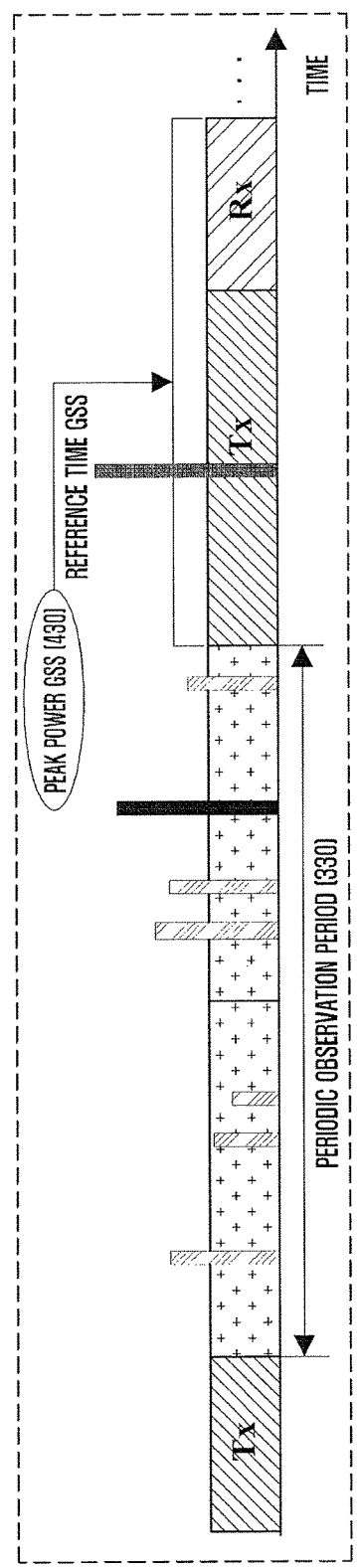

FIGS. 4A to 4C are diagrams illustrating operations of a terminal at respective operation periods of in a frame structure of FIG. 3 according to an exemplary embodiment of the present invention.

Referring to FIGS. 4A to 4C, at the beginning of the communication, the terminal monitors to receive any synchronization signal from neighbor terminals for the observation period of at least two frames. If any synchronization signal is received in the initial observation period 310, the terminal normalizes the reception time of the synchronization signal 410 received at the peak power and sets the normalized time as the initial reference time of the terminal. If no synchronization signal is received in the initial observation period 310, the terminal sets the start time point of the synchronization slot of the next frame as the reference time of the terminal. Although the description is directed to the case where the initial observation period is 2 frames, the initial observation period can be set to a length equal to or greater than three frames.

In the initial observation period 310, the terminal determines the reference time for synchronization transmission. After the initial observation period 310, the Tx period 320a and Rx period 320b appear alternately. Each of the Tx and Rx period 320a and 320b has a length of one frame. The terminal transmits its synchronization signal 420 at the start time of the Tx period or after a reference time (e.g., reception time acquired by normalizing the peak power synchronization signal) predetermined based on the start time of the Tx period 320a. The terminal does not receive any synchronization from the neighbor terminals in the Tx period 320a. After transmitting the synchronization signal, the terminal starts Rx period 320b of 1 frame subsequent to a 0.5 frame of reference time. In the Rx period 320b, the terminal monitors to detect the synchronization signal received at a maximum transmission among the synchronization signals received at a power level equal to or greater than a predetermined threshold. If the time at which the maximum transmission power synchronization signal is detected at a time earlier than the reference time, the terminal resets the reference time of the terminal to the reception time of the synchronization signal and, otherwise, if the maximum transmission power synchronization signal is detected at a time later than the reference time or not detected, maintains the current reference time. The terminal transmits a synchronization signal in the next Tx period. Through this transmission/observation structure, the terminal exchanges synchronization signals carrying the reference time information with neighbor terminals and updates the reference time based on the received synchronization signal so as to acquire synchronization of the reference time with the neighbor terminal.

In the case that the network environment changes due to appearance, disappearance, and/or movement of a terminal within the network, it may be impossible to exchange any synchronization signal with the changed terminal in the observation period of 1 frame. Accordingly, the terminal has the dedicated observation period 330 of at least two consecutive frames appearing periodically. The terminal receives the synchronization signals transmitted by the neighbor terminals within the changed network in the dedicated observation period 330 of two consecutive frames periodically. The terminal determines the next Tx/Rx periods alternating based on the position of the received synchronization signal 430. For example, if the peak power synchronization signal 430 is received in the first frame of the periodic observation period of at least 2 subframes, the terminal performs i) observation and ii) transmission alternately for receiving the peak power synchronization signal 430 in the next observation period. The length of the dedicated observation period 330 can be set to 2 or more frames.

Through this synchronization procedure, the terminals in a predetermined range of the network enter a state where the change of the reference time of the synchronization signal received at the peak power level for a predetermined time duration is maintained within the range of a few samples, i.e. Synchronization Lock (Sync Lock). The synchronization method according to an exemplary embodiment of the present invention operates based on the time when the synchronization signal is received at a maximum reception power level so as to enter the Sync Lock state very quickly. However, this method may cause a phenomenon in which only the terminals located within a certain range form a Sync Lock group.

Figure 5A:
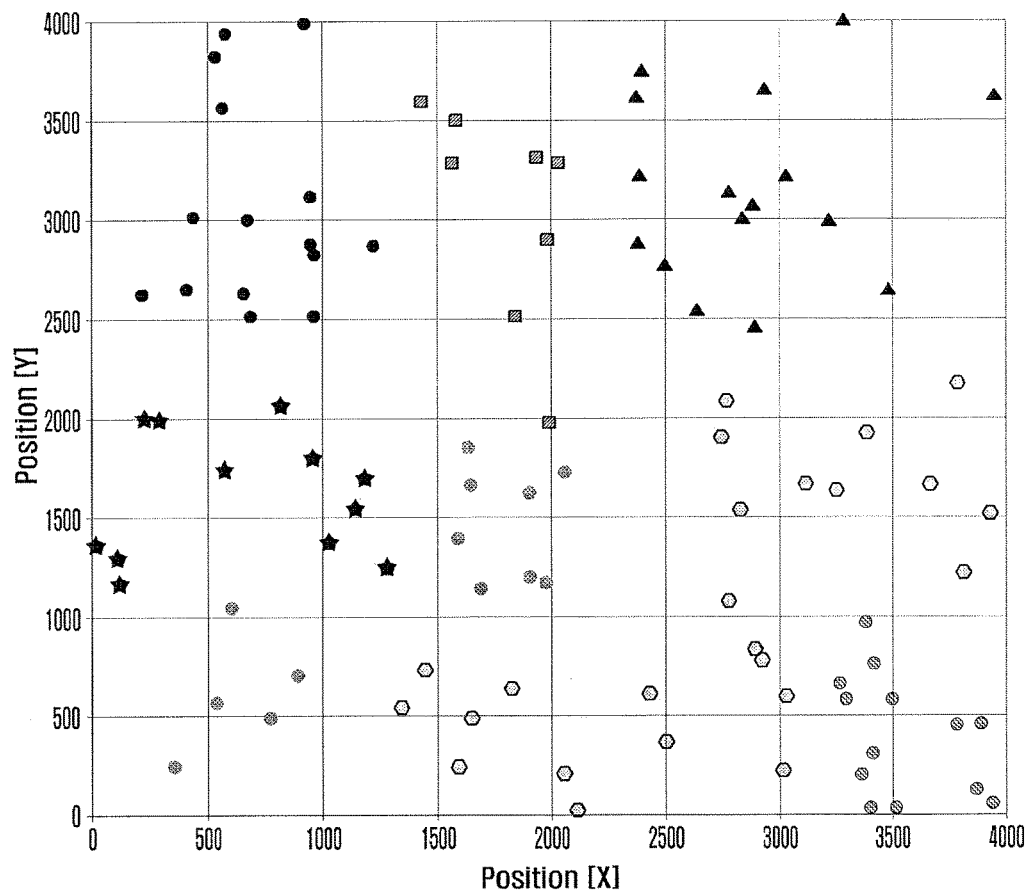
FIGS. 5A and 5B a graphs illustrating the terminal synchronization grouping in the case of FIGS. 3 and 4A to 4C according to an exemplary embodiment of the present invention.
Figure 5B:
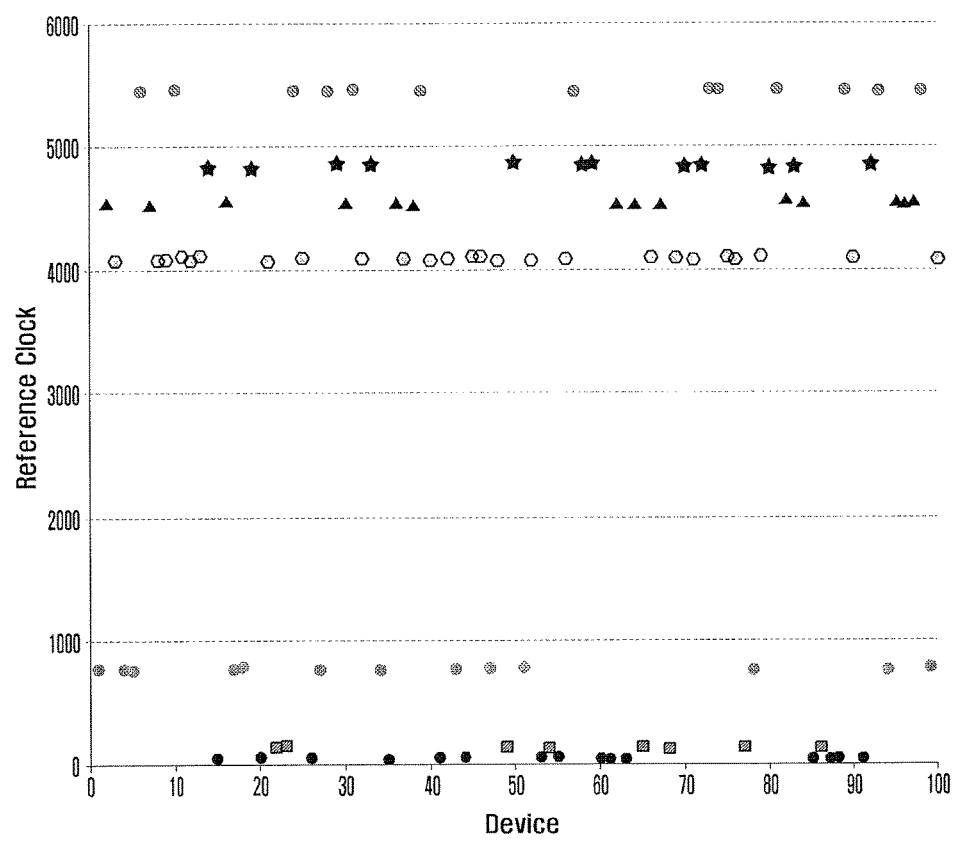

FIGS. 5A and 5B graphs illustrating a terminal synchronization grouping in the case of FIGS. 3 and 4A to 4C according to an exemplary embodiment of the present invention.

FIG. 5A shows the x and y coordinates of the terminals. That is, the x and y axes denote location coordinates of the terminals. In FIG. 5B, the x axis denotes the terminal indices, and the y axis denotes the synchronized reference clock. Although the terminals positioned around the Sync Lock group boundary are close to the terminal within the Sync Lock group, they cannot communication with each other due to the reference time mismatch. In order to overcome this problem, exemplary embodiments of the present invention propose a method for acquiring synchronization between two groups with the relay of a certain terminal.

Figure 6:
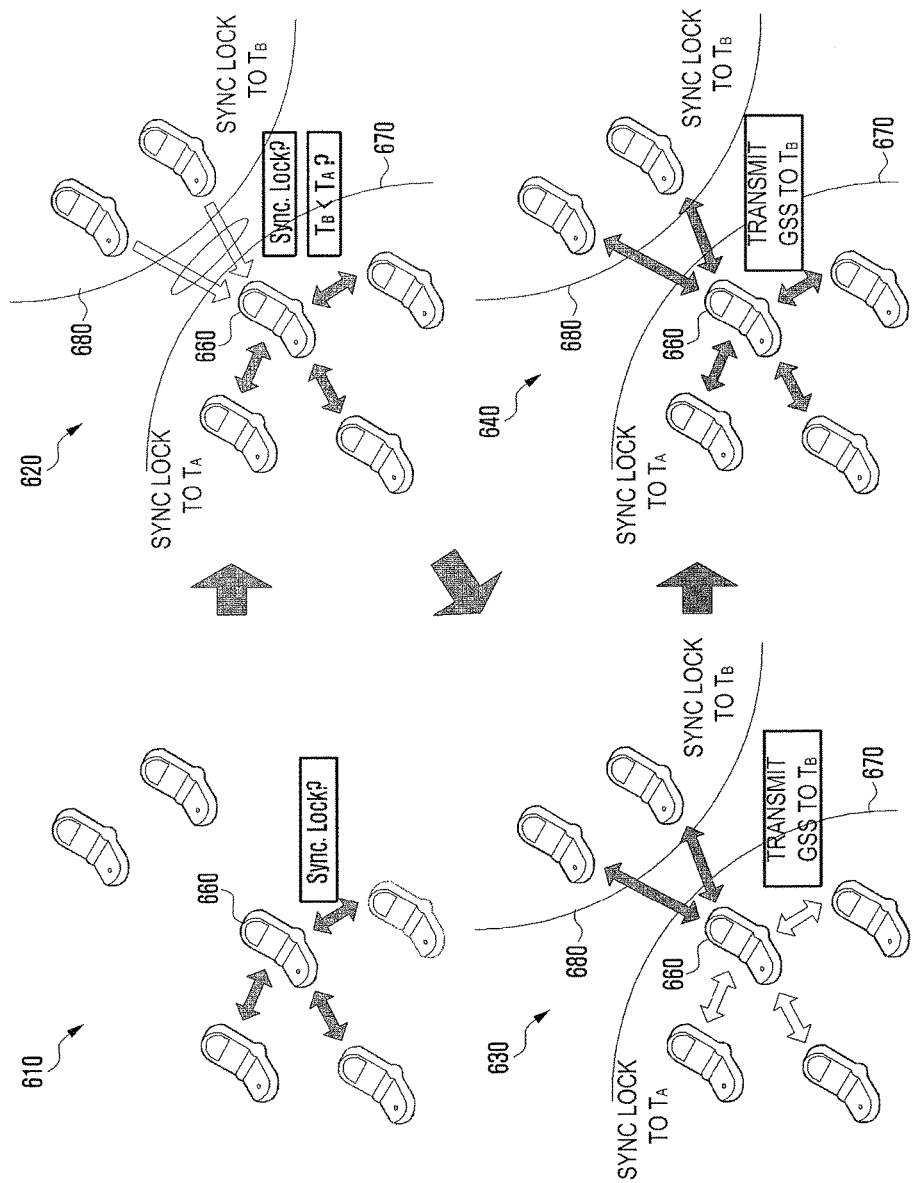
FIG. 6 is a diagram illustrating a mechanism of synchronization between synchronization groups in a terminal synchronization method according to an exemplary embodiment of the present invention.

FIG. 6 is a diagram illustrating a mechanism of synchronization between synchronization groups in a terminal synchronization method according to an exemplary embodiment of the present invention.

Referring to FIG. 6, a terminal 660 monitors the change of peak power synchronization signal to determine the Sync Lock state entry of the group 670 to which the terminal 660 belongs as denoted by reference number 610. If the terminal 660 is not in the Sync Lock state, the terminal 660 checks the Sync Lock state entry periodically or when it is necessary until the terminal 660 enters the Sync Lock state.

Reference number 620 denotes the synchronization lock state. In the synchronization lock state, the terminal 660 searches for neighbor synchronization lock group 680. At this time, some part before and after the peak power synchronization signal reception time $T_A$ are ruled out for the additional synchronization lock group search period. Upon receipt of a neighbor synchronization signal, the terminal becomes aware of the existence of other terminals 680 operating with another reference signal $T_B$ different from its reference signal $T_A$. The terminal 660 observes the change of the neighbor synchronization signal in a predetermined time duration for checking the synchronization lock state of the terminals 680 transmitting the neighbor synchronization signal. If the neighbor synchronization signal is received at the same timing $T_B$, the corresponding terminal 680 is in the synchronization lock group, i.e. in Sync Lock state. Upon detection of the synchronization lock group, the terminal 660 works as a relay terminal for acquiring synchronization between two synchronization lock groups. If the synchronization time $T_B$ of the neighbor synchronization signal is earlier than the reference time $T_B$ of the neighbor synchronization signal, the relay terminal 660 resets its reference time to the reference time $T_B$ of the neighbor synchronization signal and, otherwise if the synchronization time $T_B$ of the neighbor synchronization signal is equal to or later than the reference time $T_B$ of the addition synchronization signal, maintains the current reference time. A description is made of an exemplary procedure for the terminal 660 to update its reference time for the neighbor reference time $T_B$ of the neighbor synchronization signal herein.

The relay terminal 660 transmits the synchronization signal to the neighbor terminals within the home synchronization group 670 in the next Tx period. In the case that the relay terminal 660 transmits the transmission signal at the reset reference time $T_B$, the reference times of the neighbor terminals in the home synchronization group 670 are updated to the reference time $T_B$ through the alternate transmission-reception mechanism in closest-first order. This process is performed gradually to the terminals within the home synchronization lock group of the relay terminal 660 such that the two synchronization lock groups 670 and 680 acquire synchronization of reference time.

Figure 7:
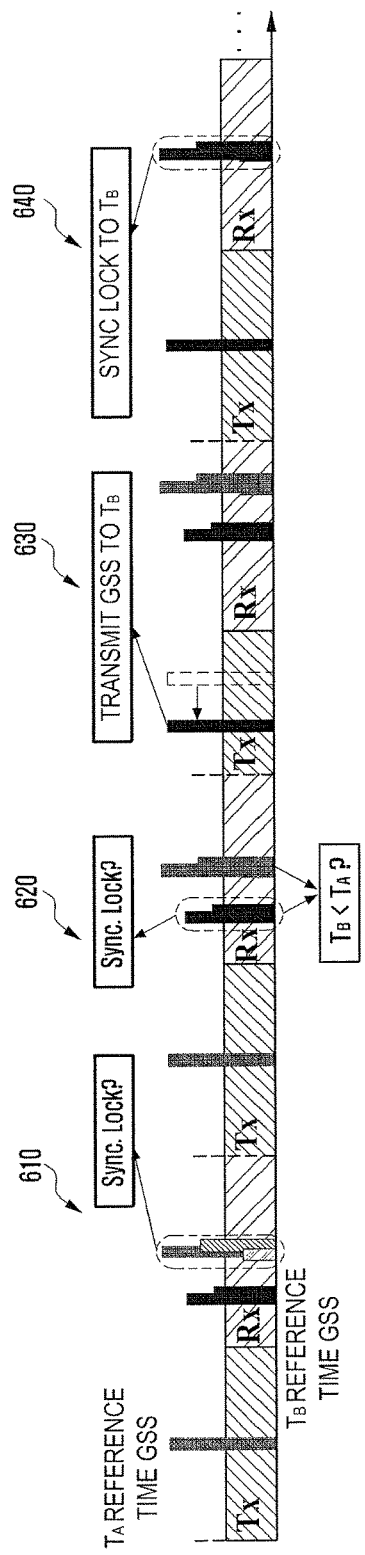
FIG. 7 is a diagram illustrating the operation pattern of the relay terminal for the synchronization procedure between two synchronization groups in the synchronization method according to an exemplary embodiment of the present invention.

FIG. 7 is a diagram illustrating an operation pattern of a relay terminal for a synchronization procedure between two synchronization groups in a synchronization method according to an exemplary embodiment of the present invention.

Referring to FIG. 7, the terminal 660 first determines whether it has entered the synchronization lock state to form a home synchronization group as denoted by reference number 610. If the terminal 660 is in the synchronization lock state, the terminal 660 observes to detect any neighbor synchronization signal in the period, with the exception of the period corresponding to the synchronization lock, from the next observation period as denoted by reference number 620. At this time, if the neighbor synchronization signal is received regularly, the terminal 660 determines that a neighbor synchronization group has entered the synchronization lock state and transmits, when the neighbor reference time $T_B$ is earlier than the home reference time $T_A$, the synchronization signal at $T_B$ of the next $T_x$ period as denoted by reference number 630. As a consequence, the reference time of the terminal 660 is synchronized to $T_B$, and the reference times of the terminals in the home synchronization group 670 are synchronized to $T_B$ in the next observation period or later according to the synchronization signal transmitted by the terminal 660 as denoted by reference number 640. The synchronization of the terminal 660 may be performed before the synchronization signal transmission at the timing 630.

According to the above-described exemplary synchronization method, the terminals exchange the reference time information by detecting the synchronization signal through transmission of a preamble signal negotiated among the terminals and correlation at the physical layer of the receiver. Since it is required to perform a correlation operation continuously for a predetermined duration with high probability of receiving the synchronization signal, the repeated correlation operation may degrade the power efficiency at the receiver.

In order to improve the power efficiency in the synchronous synchronization, exemplary embodiments of the present invention propose an asynchronous synchronization transmission/reception method, a synchronization signal non-transmission method, and an observation period reduction method for reducing a terminal's power consumption for receiving a synchronization signal.

Asynchronous Synchronization Signal Transmission/Reception Method

In the D2D communication, the adjacent terminals exchange a Global Synchronization Signal (GSS) or synchronization signals directly for acquiring global synchronization to share and update reference time information without control of a base station. Through such a global synchronization procedure, the terminals within a certain range of the network enter the synchronization lock state. According to exemplary embodiments of the present invention, the synchronization procedure is performed based on the maximum reception power of the synchronization signal such that the terminals enter the synchronization lock state quickly and maintain the synchronization reference time after the entry to the synchronization lock state in the corresponding area due to the geographical distribution of the terminals as compared to the method for configuring the reference time with the weight of the reception power of the synchronization signal. Also, each terminal elongates its synchronization signal transmission interval after the synchronization lock state entry so as to improve the power utilization efficiency for transmitting synchronization signal.

In an asynchronous synchronization signal transmission/reception method according to an exemplary embodiment of the present invention, each terminal determines whether it has entered the synchronization lock state. If it is determined to have entered the synchronization lock state, the terminal increases the synchronization signal transmission period of 1 frame to n frames, where n is greater than 1, to improve the synchronization signal transmission power efficiency.

Figure 8:
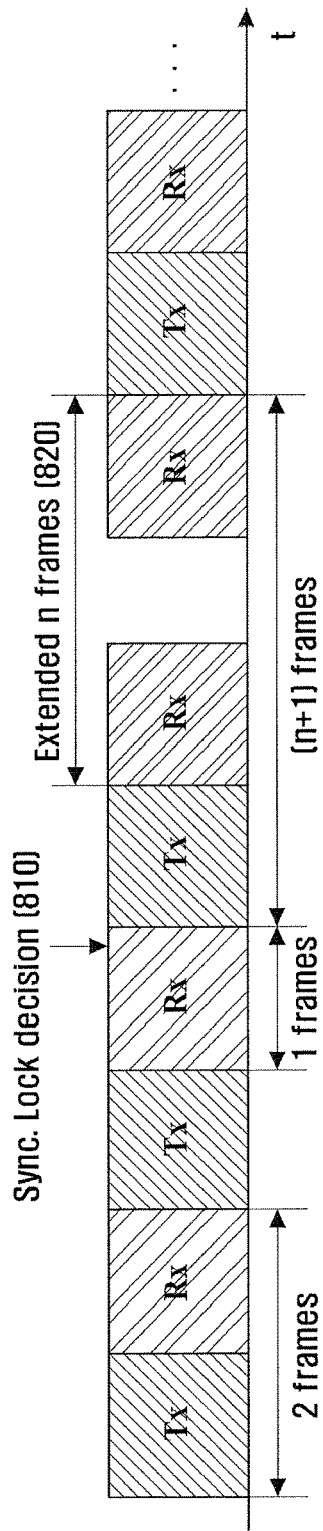
FIG. 8 is a diagram illustrating a transmission-reception pattern of a asynchronous synchronization transmission/reception method according to an exemplary embodiment of the present invention.

FIG. 8 is a diagram illustrating a transmission-reception pattern of an asynchronous synchronization transmission/reception method according to an exemplary embodiment of the present invention.

Referring to FIG. 8, the terminals are configured with the same transmission/observation periods to perform the synchronization signal exchange quickly among each other and continue observation for synchronization lock. After entering the synchronization lock state at the timing 810, the terminal increases the observation period to the length of n frames as denoted by reference number 820 so as to reduce the power consumption for synchronization signal transmission. By restricting the synchronization signal transmission at each terminal, it is possible to reduce the synchronization signal detection performance degradation caused by interference occurring at the receiver between the synchronization signals transmitted simultaneously.

In the synchronization procedure of this exemplary embodiment, all terminals transmit/receive a synchronization signal in units of 2 (more) frames and thus each terminal has to observe the variation of the reception time (reference time) of the synchronization signal received at the peak power level in the frame period to detect the synchronization lock state entry. Each terminal compares the highest level synchronization signal reception times in a predetermined number of frames counting back from current frame and determines, if there is no change in the reception time normalized in unit frame, that it has entered the synchronization lock state.

The synchronization lock state is determined based on the temporal change of the highest synchronization signal reception power using a formula such as Equation (1):

$$|T(f_{bef}) - T(f_{curr})| < S_{SL} \qquad \text{Equation (1)}$$

In Equation (1), $f_{bef}$ denotes the previous frame index for determining synchronization lock state, $f_{curr}$ denotes the current frame index, $T(f)$ denotes a reception time of the normalized highest synchronization signal reception power of the $f^{th}$ frame, and $S_{SL}$ denotes the sample difference of the average time allowable for synchronization lock determination. If the condition of Equation (1) if fulfilled, this means that the terminal is in the synchronization lock state.

Although Equation (1) is used to check the temporal change of the peak power reception time, the following equation can be applied to improve the stability of the synchronization lock state entry determination by taking notice of the variation in detecting the synchronization signal caused by instability of network synchronization signal reception time caused by the terminal movement, noise, channel variation, and the like. Equation (2) gives the condition under which the synchronization lock state entry is determined when the peak power synchronization signal reception time experiences sample variation less than $S_{SL}$ for the duration of $N_{SL}$ frames.

Equation (2) gives an exemplary condition for determining synchronization lock state:

$$\frac{1}{(N_{SL}/2)} \left| \sum_{f=f_{curr}-N_{SL}+1}^{f_{curr}-N_{SL}/2} T_{GSS}(f) - \sum_{f=f_{curr}-N_{SL}/2+1}^{f_{curr}} T_{GSS}(f) \right| < S_{SL} \qquad \text{Equation (2)}$$

In Equation (2), $N_{SL}$ denotes the length of a synchronization lock determination period in number of frames. $f_{curr}$ denotes the current frame position, $T_{GSS}(f)$ denotes the synchronization signal reference time of the $f^{th}$ frame, and $S_{SL}$ denotes a tolerable change range for determining synchronization lock state. Equation (2) gives an exemplary condition for determining the synchronization lock state entry when the variation of the reference time of each terminal which is determined based on the received synchronization signal reference time is less than $S_{SL}$. That is, if the condition of Equation (2) is fulfilled, this means that the terminal is in the synchronization lock state.

Synchronization Signal Non-Transmission Method

By taking notice of the characteristics of the D2D communication in which the distributed terminals form the wireless mobile communication network, the distribution of D2D terminals depends on the geographical characteristic. For example, the terminals are likely to be densely distributed within a restricted space in the case of a school, a department store, an office building, and the like. Accordingly, the D2D communication terminals may be distributed in various densities depending on the geographical characteristic from the highly dense to sparse environments.

From the viewpoint of global synchronization, since the synchronization signal power has to be maintained over a predetermined level at every location where paired D2D communication terminals are positioned regardless of the density of terminals, it is not necessary for all terminals to take part in the global synchronization procedure in the densely distributed environment, which unnecessarily wastes resources and causes inter-synchronization signal interference. In this respect, exemplary embodiments of the present invention propose a synchronization signal non-transmission method for minimizing power waste and synchronization signal collision caused especially when all the terminals unnecessarily take part in the synchronization procedure in the high density environment.

Figure 9B:
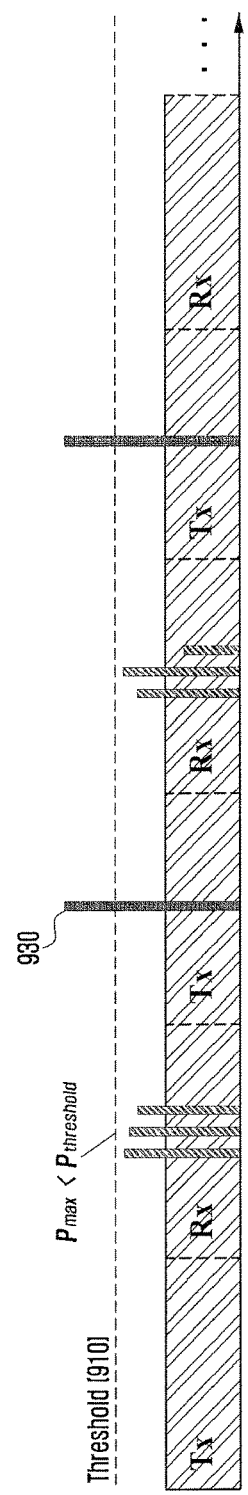

FIGS. 9A and 9B are diagrams illustrating operation patterns of a terminal for a non-synchronization signal-based procedure in a synchronization method according to an exemplary embodiment of the present invention.

Referring to FIGS. 9A and 9B, with the start of communication, the terminal performs observation in the initial observation period to configure the position where the synchronization signal is received at the peak power level as its synchronization reference time. Afterward, the terminal determines the synchronization signal transmission/observation order in the periodic dedicated observation period arriving at a predetermined interval. Accordingly, all the terminals participating in the D2D communication observe the power of the synchronization signal received in the initial observation period and the periodic dedicated observation period. If the peak power 920 of the observed synchronization signal is greater than a predetermined threshold 910 as shown in FIG. 9A, i.e. if there is a D2D terminal participating in the synchronization procedure at the position very close to the current terminal, the terminal transmits no synchronization signal and continues tracking its reference time in adaptation to the synchronization reference time of the synchronization signal received at the peak power level. Here, the threshold value is likely to be greater than the threshold value as the reference for determining whether there is any synchronization signal. If the terminal transmitting the synchronization signal, which is tracked by the current terminal, moves or terminates communication such that the peak power of the received synchronization signal becomes equal to or less than a threshold value, the terminal transmits its synchronization signal as denoted by reference number 930 as shown in FIG. 9B so as to maintain the synchronization signal power level in the corresponding area.

Synchronization Signal Observation Period Reduction

In the synchronization lock state, each terminal receives redundant synchronization signals from neighbor terminals at the synchronized reference time. In order to maintain the synchronization in the synchronization lock state, it is enough to receive only the synchronization signal with the peak power level which is transmitted by the neighbor terminal geometrically closest among the redundant synchronization signals and thus, where there is the other synchronization signal or not, give no significant influence to the global synchronization performance. Accordingly, in the synchronization lock state in which the global synchronization is maintained within a certain area, it is not necessary or the terminal to search for the synchronization signal for the whole length of 1 frame in which the synchronization signal is likely to be received. Instead, the terminal searches for a certain range of the synchronization signal positioned where the peak power synchronization signal is received so as to reduce the unnecessary power consumption of the terminal.

Figure 10:
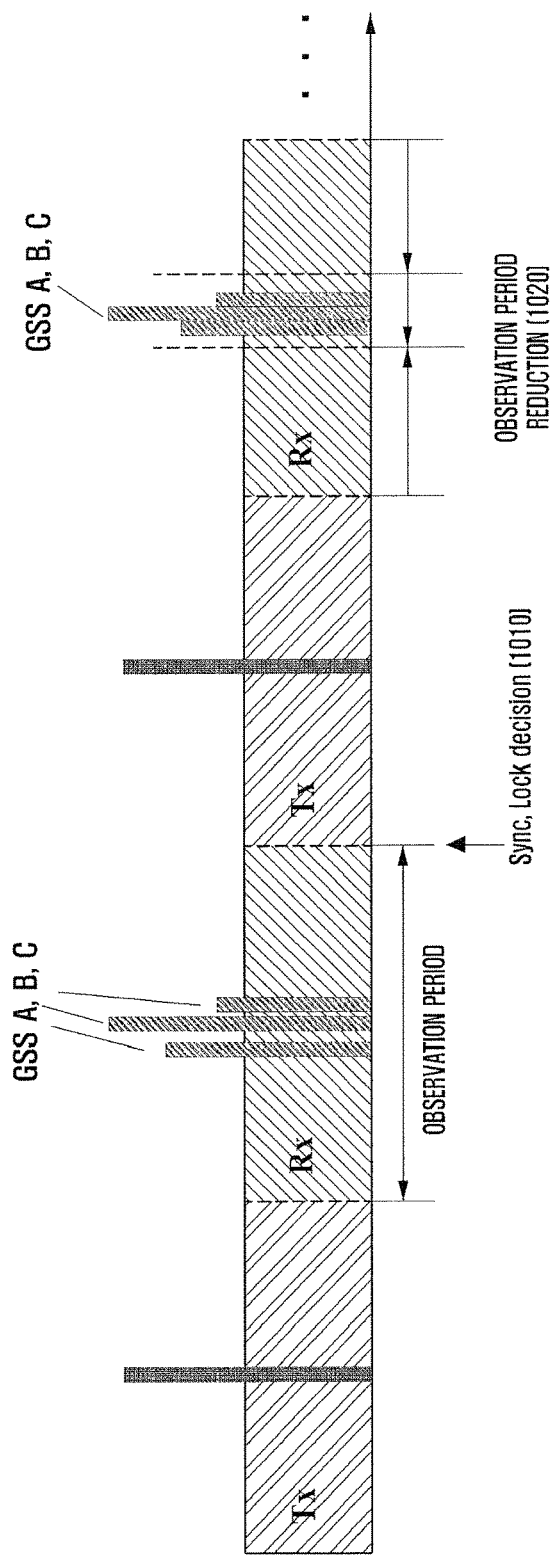
FIG. 10 is a diagram illustrating a synchronization signal observation period reduction procedure of a synchronization method according to an exemplary embodiment of the present invention.

FIG. 10 is a diagram illustrating a synchronization signal observation period reduction procedure of a synchronization method according to an exemplary embodiment of the present invention.

Referring to FIG. 10, each terminal determines whether it is in the synchronization lock state as described with reference to Equations (1) and (2) at step 1010. If it is in the synchronization lock state having no significant change in synchronization signal reception time, the terminal is capable of searching for the synchronization signal within a certain range around the reference time of receiving synchronization signal denoted by reference number 1020. In order to improve the stability, the terminal is capable of reducing the synchronization search range in a stepwise manner over time. Also, in order to minimize the power consumption, the terminal may perform the minimum range synchronization signal search after detecting the synchronization lock state entry rather than reduce the search range gradually in stepwise manner.

As described with reference to FIGS. 5A to 7, the synchronization method according to an exemplary embodiment of the present invention includes a method for overcoming the synchronization grouping caused by the geographical distribution of the terminals. In the exemplary embodiment of FIG. 10, the terminal receiving the grouped synchronization signals is capable of changing its own reference signal according to predetermined criteria. In the case of applying both the above exemplary methods simultaneously, i.e. if a specific terminal changes its reference time to remove the synchronization signal grouping effect in the synchronization lock state, the synchronization signal transmitted at the changed reference time may not be observed at the terminal which has the synchronization signal observation period reduced in adaptation to the previous reference time. Accordingly, when applying the synchronization signal observation period reduction scheme, there is a need of an additional operation and signal structure for changing the reference time of some terminals in the synchronization lock state described above.

Figure 11A:
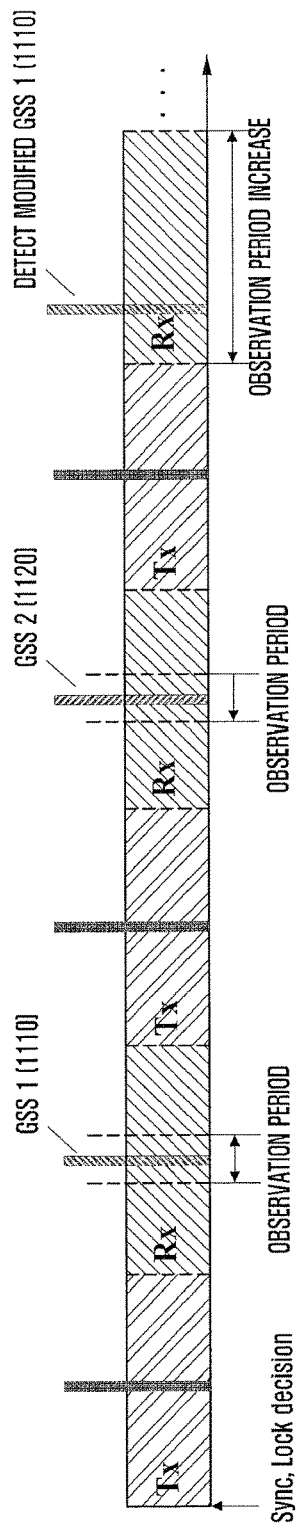
FIGS. 11A and 11B are diagrams illustrating a signal process for applying a synchronization observation period reduction scheme of a synchronization method according to an exemplary embodiment of the present invention.
Figure 11B:
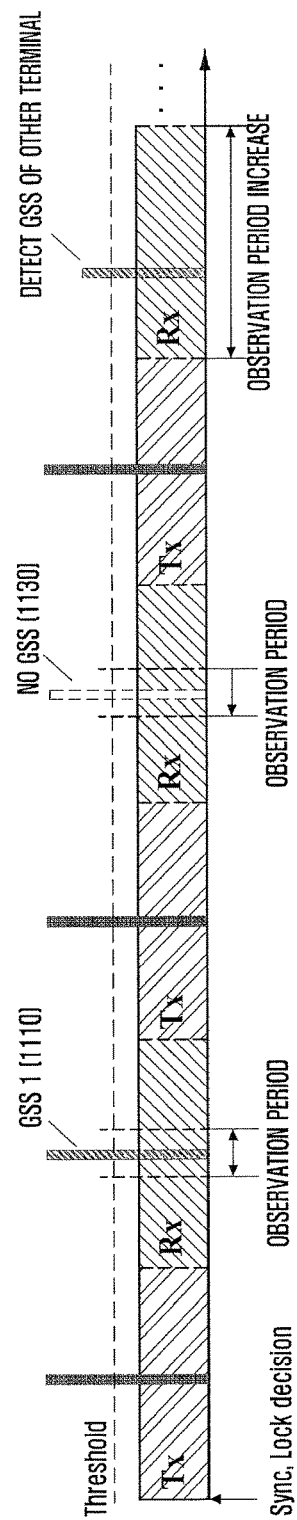

FIGS. 11A and 11B are diagrams illustrating a signal process for applying a synchronization observation period reduction scheme of a synchronization method according to an exemplary embodiment of the present invention.

Referring to FIGS. 11A and 11B, in order to change the reference time for addressing the synchronization signal grouping effect in the synchronization lock state, the terminal notifies the neighbor terminals of its reference signal change intention and transmits the synchronization signal at the changed reference time. The terminals which have reduced their synchronization signal observation periods receive the reference signal change intention and search the synchronization signal for the whole observation period at the next reception occasion to maintain the global synchronization. In order to notify of the reference time change intention in the synchronization lock state, the terminal is capable of an extra sequence for transmitting the reference time change information. In an exemplary case of FIG. 11A, if it wants to change the synchronization reference time in the state of transmitting the synchronization signal 1120 periodically, the terminal transmits the synchronization signal 1120 with different sequence at the same reference time. Afterward, the terminal transmits the synchronization signal with the same sequence as the synchronization signal 1110 at the changed reference time. In an exemplary case of FIG. 11B, if it wants to change the synchronization reference time in the state of transmitting the synchronization signal 1120 periodically, the terminal cannot change the reference time without extra notification. In this case, other terminals check the synchronization signal loss as denoted by reference number 1130 and increase the observation period.

In order to determine the effect of exemplary embodiments of the present invention, a computer simulation has been performed. Table 1 shows the parameters applied in the simulation.

TABLE 1

| Parameter | Value |
| --- | --- |
| Number of terminals | 100 |
| Terminal distribution type | Uniform distribution |
| Geographical environment | 500 m × 500 m square terrain |
|  | 1 km × 1 km square terrain |
|  | 4 km × 4 km square terrain |
| Number of samples in frame | 6000 samples |
| initial observation period length | 2 frames |
| periodic observation period length | 2 frames/20 frames |
| maximum terminal generation time | 50th frame |
| Rx power threshold | 0 dB |
| Pathloss model | ITU-1411 LOS (lower bound) |
| Synchronization signal Sync Lock observation period length | 20 frames |
| Additional GSS Sync Lock observation period length | 6 frames |
| Additional GSS observation exclusion period | Reference time ± 30 samples |

Figure 12A:
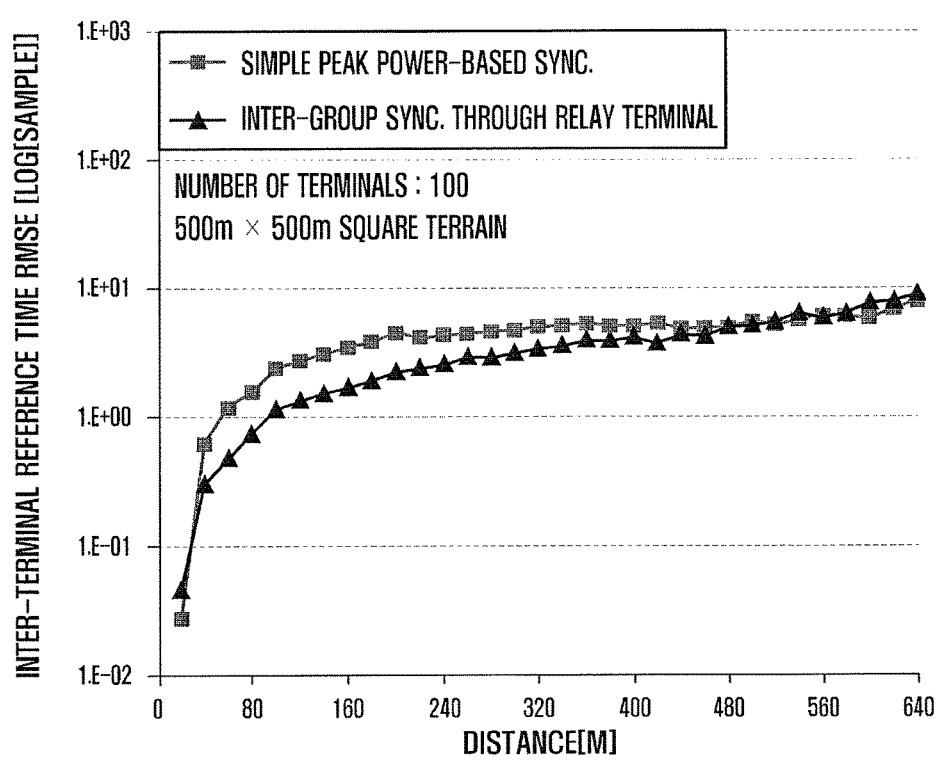
FIGS. 12A to 12C are graphs illustrating the effect of synchronization between groups through a relay terminal in the synchronization method according to an exemplary embodiment of the present invention.
Figure 12B:
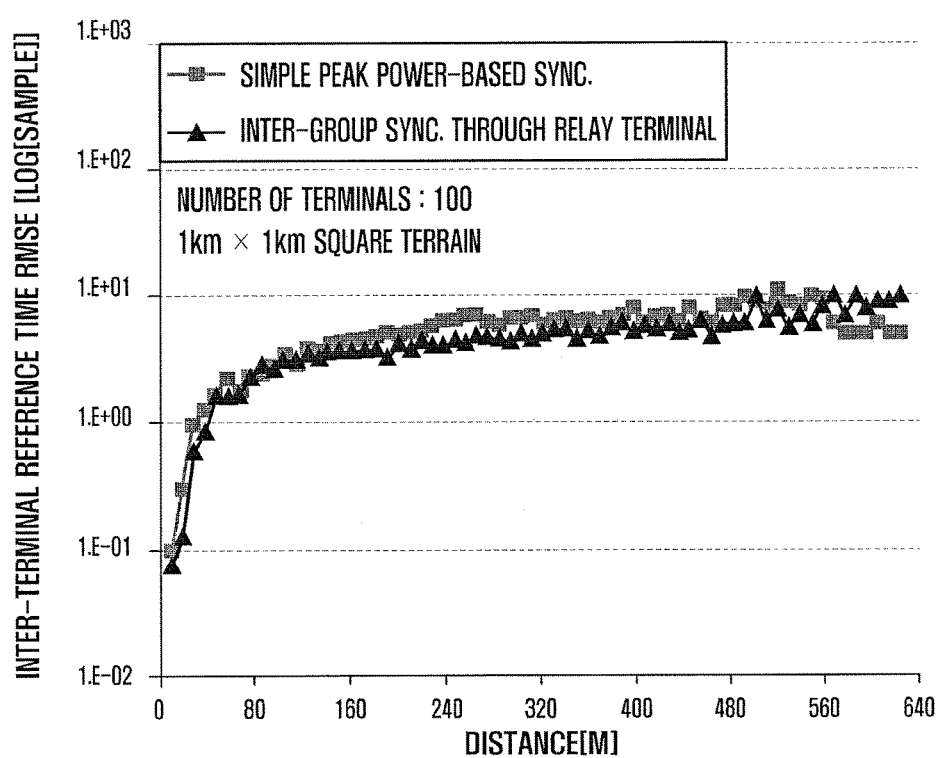
Figure 12C:
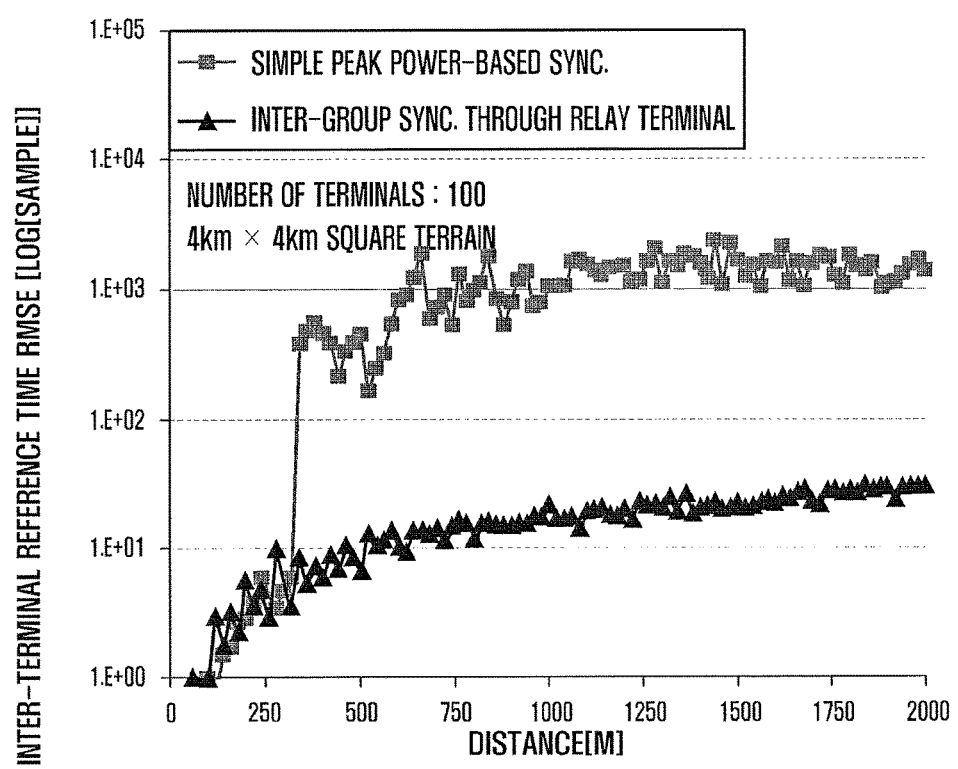

FIGS. 12A to 12C are graphs illustrating the effect of synchronization between groups through a relay terminal in the synchronization method according to an exemplary embodiment of the present invention.

Referring to FIGS. 12A to 12C, in the case that 100 terminals are distributed in the 500 m×500 m and 1 km×1 km square terrains, the terminals are located at the positions not so far from each other and thus it is possible to perform global synchronization without difficulty in configuring the reference time based on the simple peak power. In the case that the global synchronization is established completely, it is shown that the Root Mean Square Error (RMSE) of the terminals' reference times tends to increase as the distance between terminals increases and the reference time difference between terminals is no more than 10 samples. However, in case of relaying on only the simple peak power-based synchronization scheme, if the terminals are distributed in a large area, the grouping effect in which the terminals within a certain range are in synchronization may occur depending on the distribution pattern of the terminals. This may cause a large reference time difference between closely located terminals. FIG. 12C shows the possibility of addressing the problem of a large reference time difference between adjacent terminals by inter-group synchronization through a relay terminal.

Figure 13:
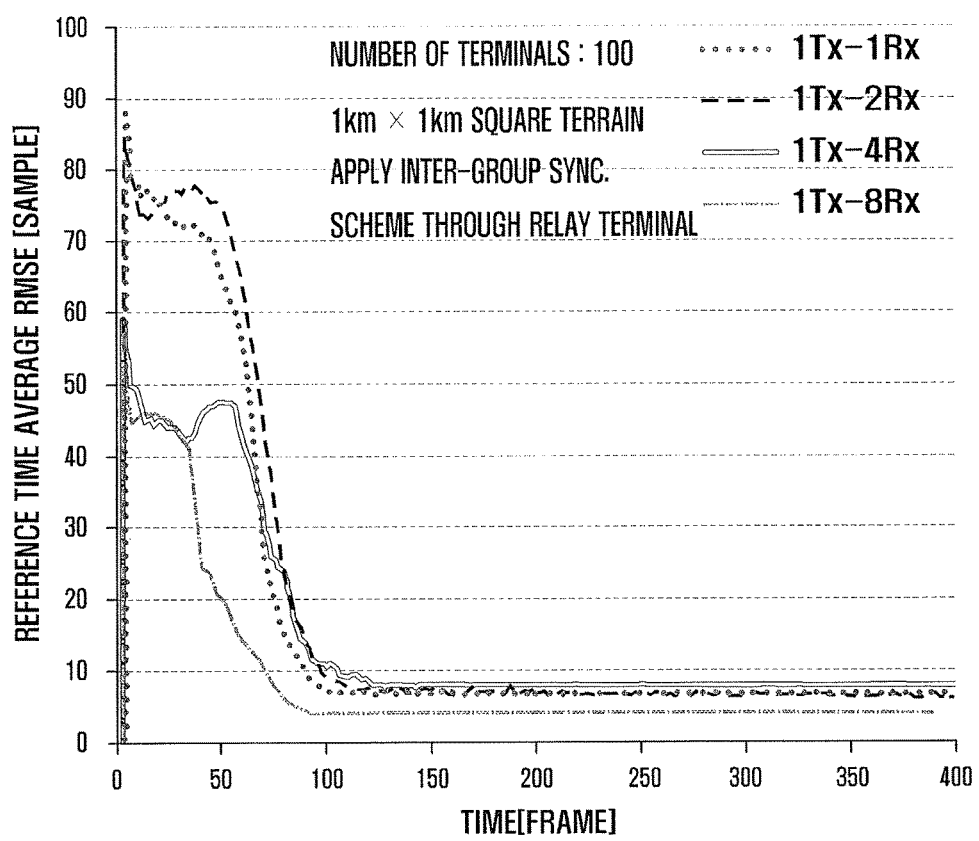
FIG. 13 is a graph illustrating an average RMSE performance of a global synchronization through increase of observation period in a synchronization method according to an exemplary embodiment of the present invention.

FIG. 13 is a graph illustrating an average RMSE performance of a global synchronization through increase of observation period in a synchronization method according to an exemplary embodiment of the present invention.

Referring to FIG. 13, it is shown that due to the establishment of terminals and the inter group synchronization process through a relay terminal the reference time RMSE fluctuates significantly for about 100 frames duration but enters the synchronization lock state after the 100th frame and the synchronization lock state is maintained, although the observation period increase scheme is applied after the synchronization lock state entry, regardless of the increase of the Rx observation period.

Figure 14:
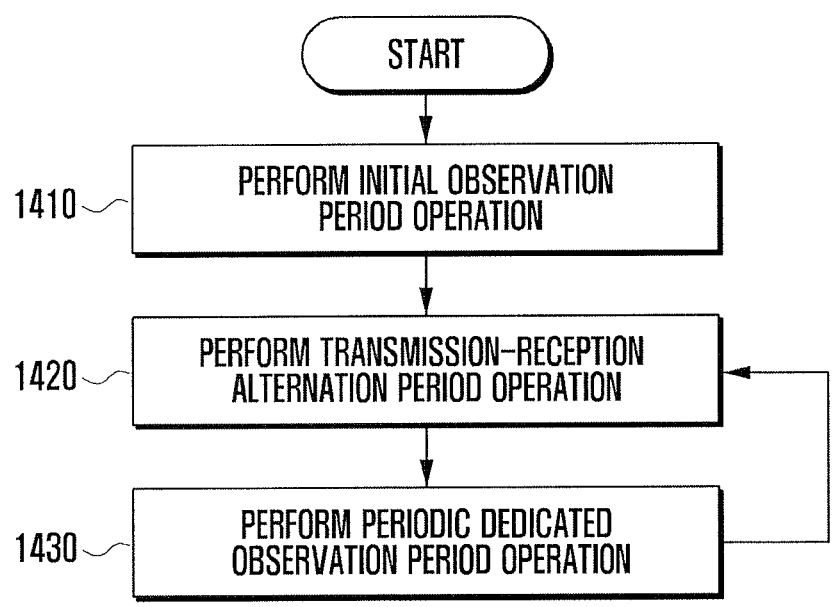
FIG. 14 is a flowchart illustrating a synchronization method according to an exemplary embodiment of the present invention.

FIG. 14 is a flowchart illustrating a synchronization method according to an exemplary embodiment of the present invention.

Referring to FIG. 14, the terminal performs observation in the initial observation period at step 1410, transmission and observation in the transmission-observation alternation period at step 1420, and observation in the periodic observation period 1430. More detailed descriptions on the operations in the respective operation periods are made later with reference to the aforementioned drawings and FIGS. 15 to 21.

Figure 15:
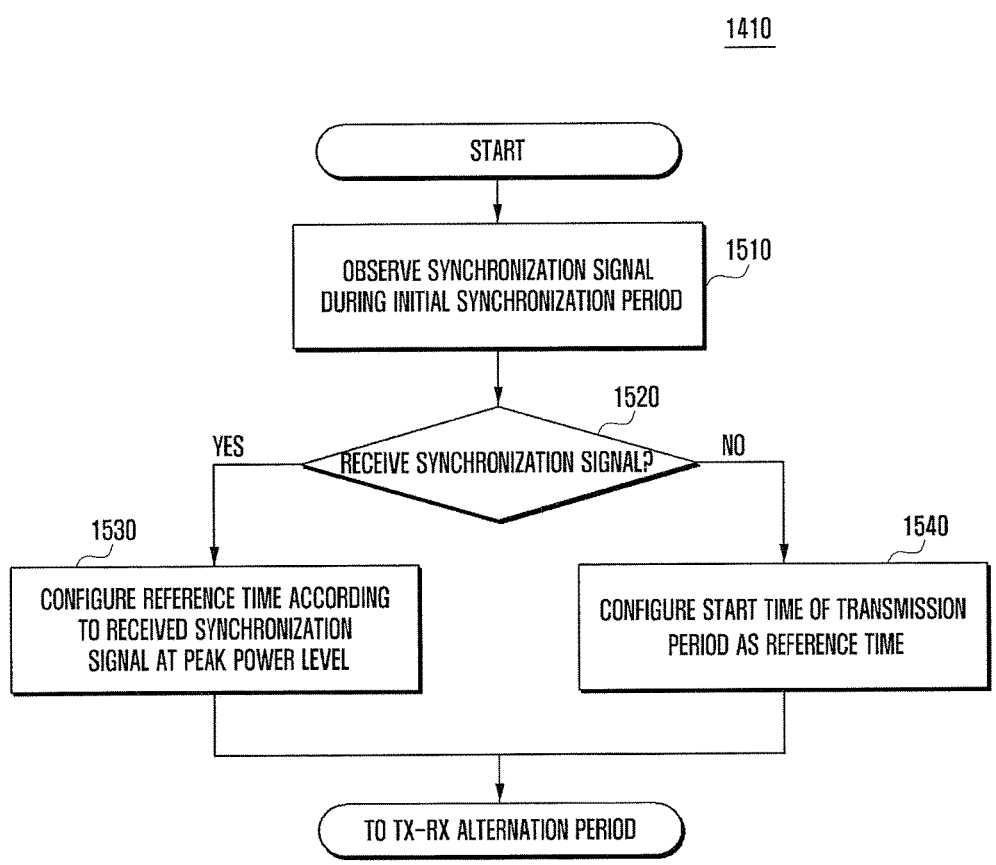
FIG. 15 is a flowchart illustrating an initial observation period procedure of FIG. 14 according to an exemplary embodiment of the present invention.

FIG. 15 is a flowchart illustrating an initial observation period procedure of FIG. 14 according to an exemplary embodiment of the present invention.

For reference, a description has been made of the initial observation with reference to FIG. 3. Referring to FIG. 15, the terminal observes the synchronization signal during the initial observation period at step 1510. The terminal determines whether any synchronization signal is received during the initial observation period at step 1520. If a pre-negotiated sequence is received at over a predetermined power level, the terminal determines that the synchronization signal has been received. If the synchronization signal is received, the terminal configures the reference time according to the synchronization signal received at the peak power at step 1530. If no synchronization signal is received, the terminal configures the start time of the transmission period of the transmission-reception alternation period or a predetermined time point as the reference time at step 1540.

Figure 16:
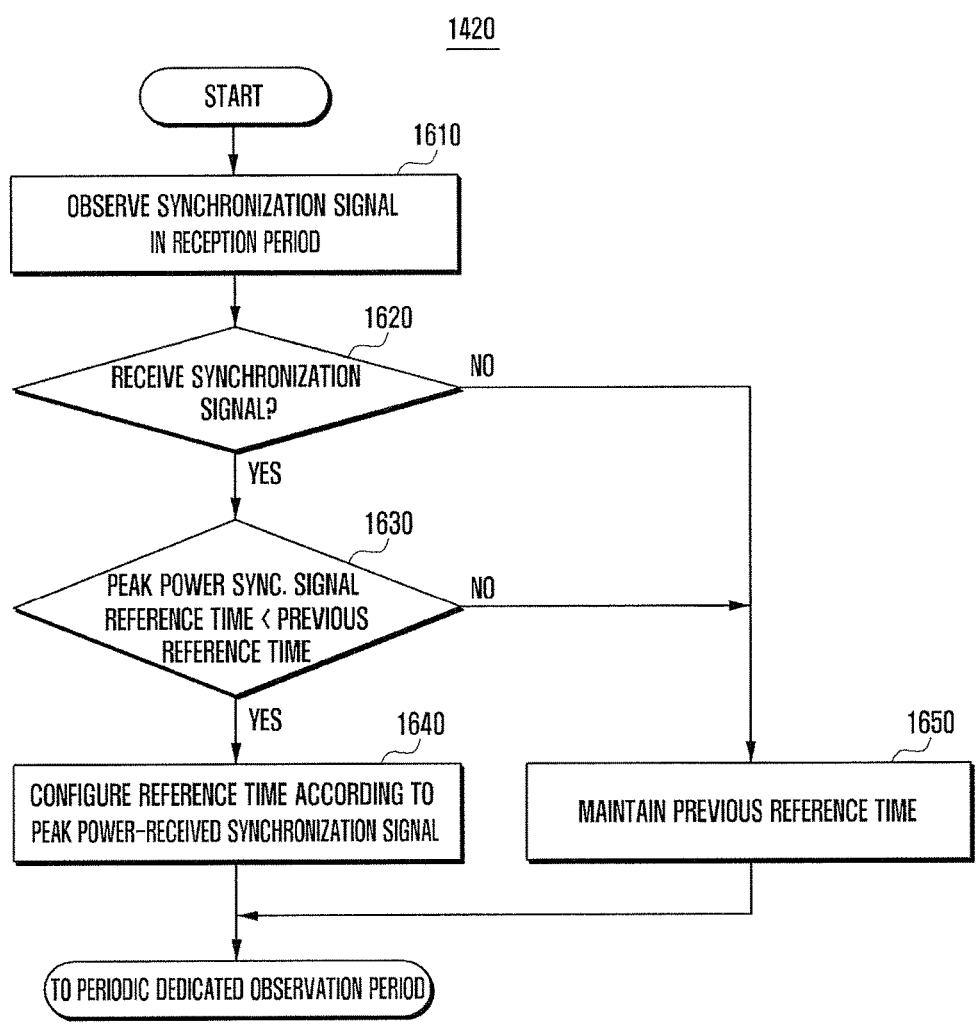
FIG. 16 is a flowchart illustrating a transmission-observation alternation period procedure of FIG. 14 according to an exemplary embodiment of the present invention.

FIG. 16 is a flowchart illustrating a transmission-observation alternation period procedure of FIG. 14 according to an exemplary embodiment of the present invention.

As described with reference to FIG. 3, the transmission-observation period includes the alternating transmission and the reception frames 320a and 320b. According to a modified exemplary embodiment, the reception frame may be elongated or a part of the transmission frame may be deleted.

Referring to FIG. 16, the terminal observes the synchronization signal in the reception frame 320, i.e. reception period, at step 1610. If it is determined that a synchronization signal is received in step 1620, the procedure goes to step 1630. Otherwise if not synchronization signal is received, the terminal maintains the previous reference time at step 1650.

The terminal determines whether the reference time of the peak power synchronization signal among the received synchronization signals is earlier than the previous reference time at step 1630. If the reference time of the peak power synchronization signal is earlier than the previous reference time, the terminal configures the reference time according to the synchronization signal received at the peak power at step 1640. Otherwise, if the reference time of the peak power synchronization signal is not earlier than the previous reference time, the terminal maintains the previous reference time at step 1650.

Figure 17:
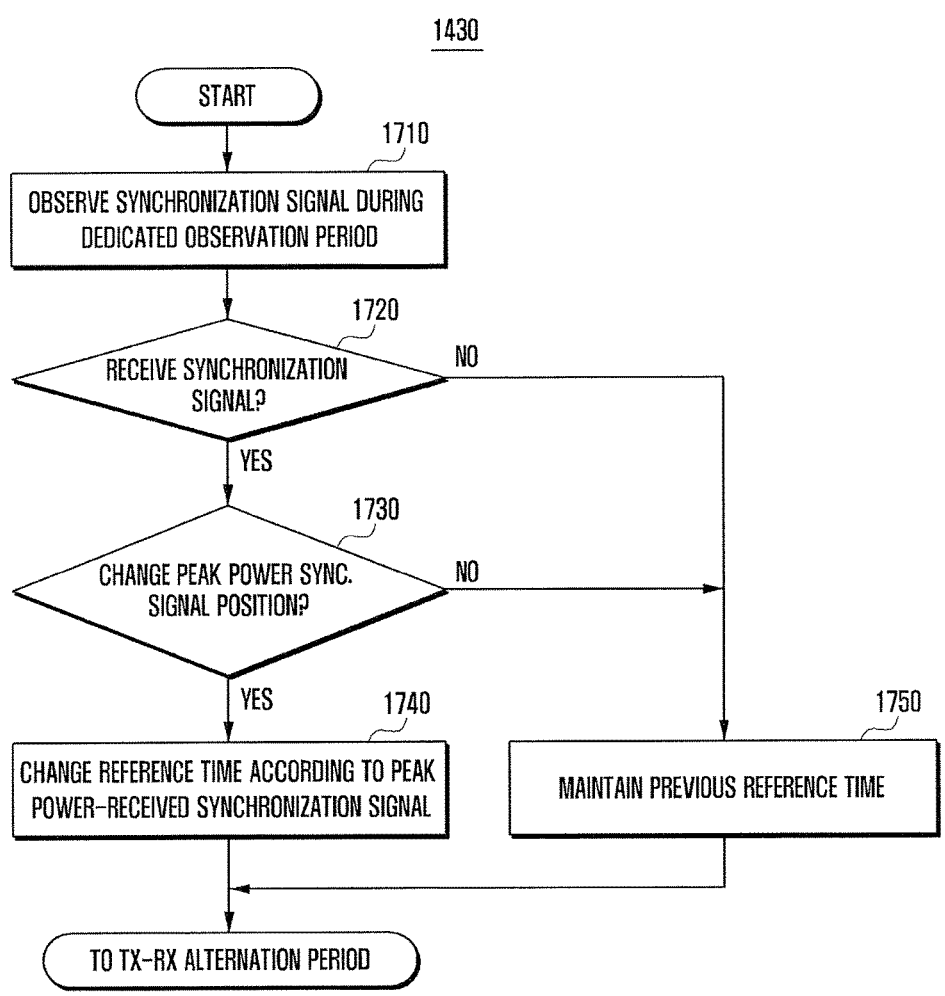
FIG. 17 is a flowchart illustrating a periodic dedicated observation period procedure of FIG. 14 according to an exemplary embodiment of the present invention.

FIG. 17 is a flowchart illustrating a periodic dedicated observation period procedure of FIG. 14 according to an exemplary embodiment of the present invention.

As described with reference to FIG. 3, the dedicated observation period 1430 appears periodically. The terminal observes the synchronization signal without synchronization signal transmission in the dedicated observation period 1430 having the length equal to or greater than two frames.

Referring to FIG. 17, the terminal observes the synchronization signal during the whole dedicated observation period at step 1710. The terminal determines whether a synchronization signal is received at step 1720. If the synchronization signal is received, the procedure goes to step 1730. At step 1730, the terminal determines whether the position of the peak power synchronization signal, i.e. the reference time, has changed. If the reference time has changed, the terminal changes its reference time according to the changed reference time of the peak power synchronization signal at step 1740. If no synchronization signal is received or the reference time of the peak power synchronization signal has not been changed, the terminal maintains the previous reference time at step 1750.

Figure 18:
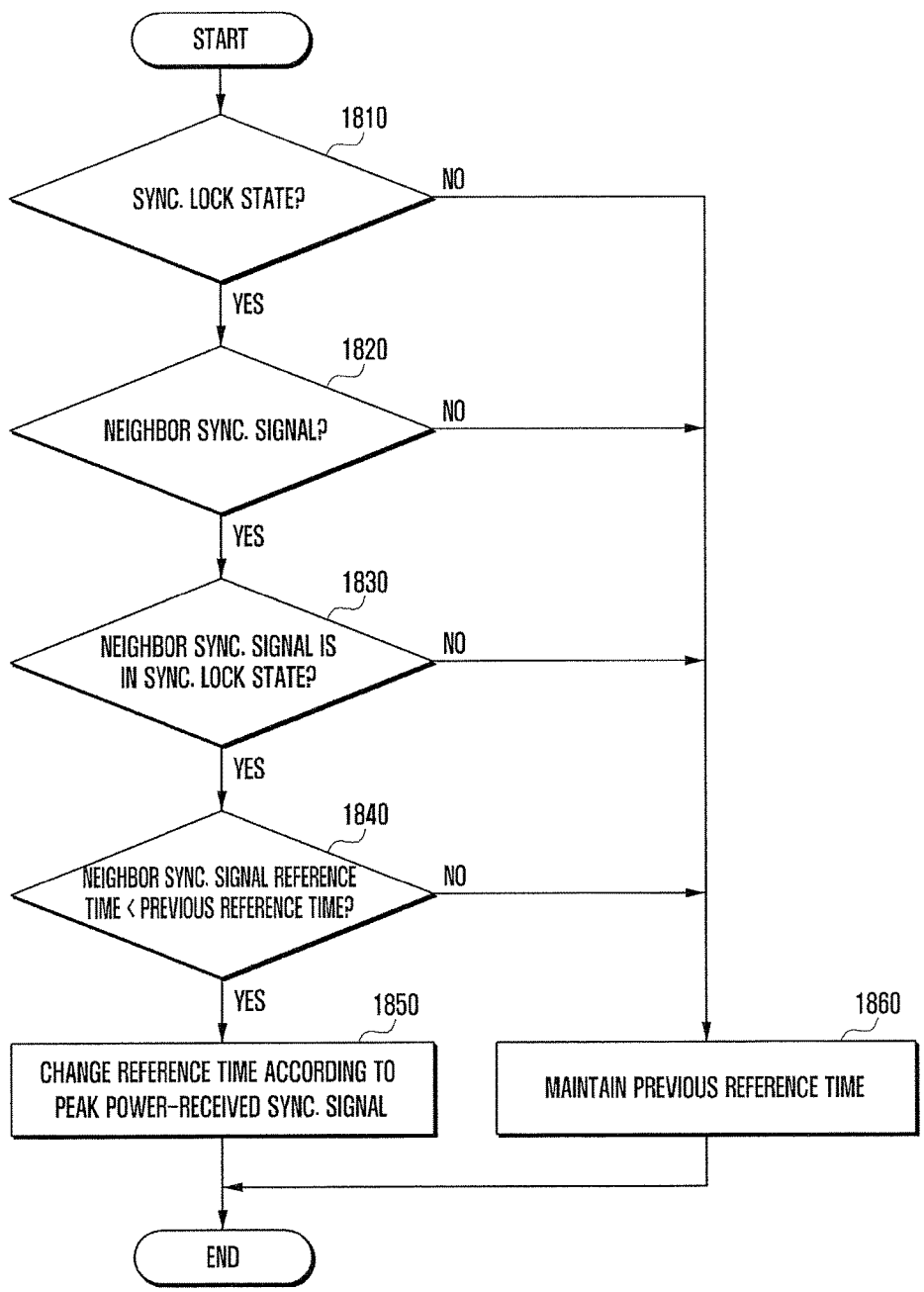
FIG. 18 is a flowchart illustrating an operation of a relay terminal for synchronization between synchronization lock state groups in a synchronization method according to an exemplary embodiment of the present invention.

FIG. 18 is a flowchart illustrating an operation of a relay terminal for synchronization between synchronization lock state groups in a synchronization method according to an exemplary embodiment of the present invention.

Referring to FIG. 18, the terminal determines whether it is in the synchronization lock state at step 1810. The synchronization lock state entry can be determined depending on whether the change of the reference time of the synchronization signal fulfills Equation (1) or Equation (2) or another condition. If it is determined that the terminal is in the synchronization lock state, the procedure goes to step 1820.

At step 1820, the terminal determines whether a neighbor synchronization signal having a different reference time is received. If the neighbor synchronization signal is received, the procedure goes to step 1830. At step 1830, the terminal determines whether the received neighbor synchronization signal is in the synchronization lock state. The determination can be made based on Equation (1) or Equation (2) or another condition. If the neighbor synchronization signal is in the synchronization lock state, the procedure goes to step 1840.

At step 1840, the terminal determines whether the reference time of the neighbor synchronization signal is earlier than the terminal's reference time. If the reference time of the neighbor synchronization signal is earlier than the terminal's reference time, the terminal changes its reference time for the reference time of the neighbor synchronization signal at step 1850. If at least one of the conditions at steps 1810 to 1840 is not fulfilled, the terminal maintains the previous reference time at step 1860.

Figure 19:
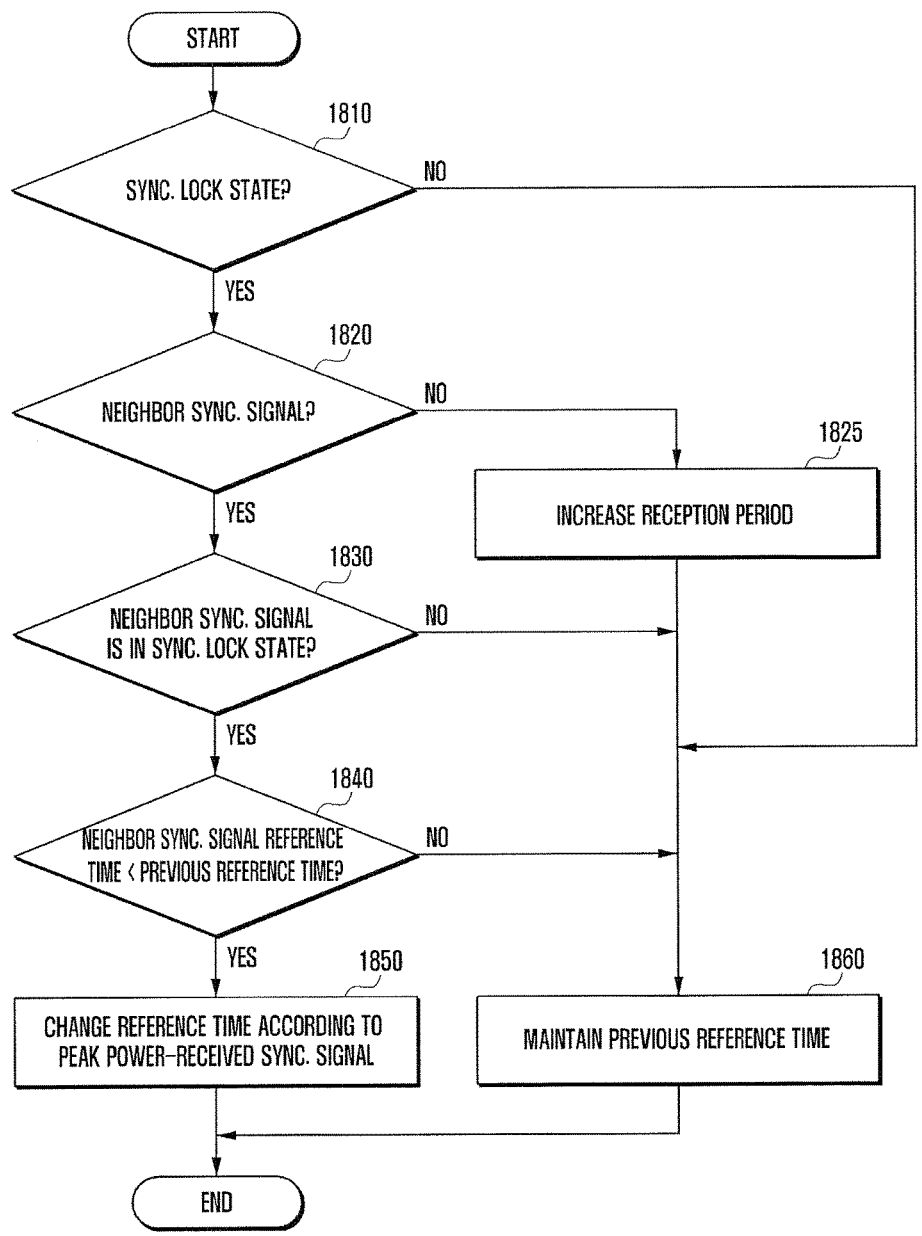
FIG. 19 is a flowchart illustrating a reception period rate increase procedure of a synchronization method according to an exemplary embodiment of the present invention.

FIG. 19 is a flowchart illustrating a reception period rate increase procedure of a synchronization method according to an exemplary embodiment of the present invention.

Referring to FIG. 19, which illustrates a procedure substantially the same as the procedure of FIG. 18 and thus repeated steps will not be described again for convenience, if no neighbor synchronization signal is detected at step 1820, the terminal increases the reception period at a predetermined rate at step 1825. That is, if a neighbor synchronization signal is not received after entering the synchronization lock state, the terminal assumes the stable state and configures the reception frame 820 to be longer than the transmission frame as shown in FIG. 8.

Figure 20:
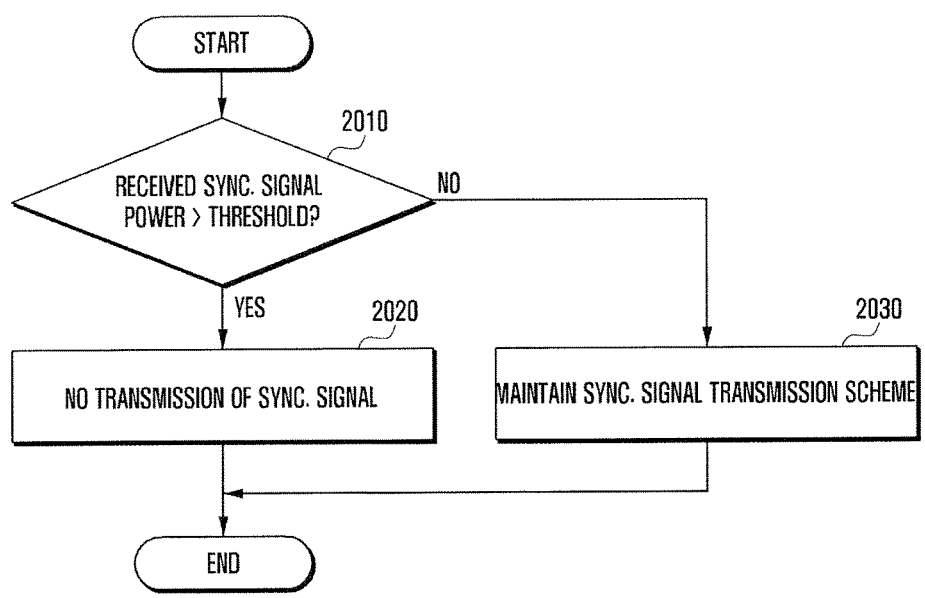
FIG. 20 is a flowchart illustrating a synchronization signal non-transmission procedure in a synchronization method according to an exemplary embodiment of the present invention.

FIG. 20 is a flowchart illustrating a synchronization signal non-transmission procedure in a synchronization method according to an exemplary embodiment of the present invention.

Referring to FIG. 20, the terminal determines whether the reception power of the synchronization signal is greater than the threshold value (see FIG. 9A) at step 2010. If the reception power of the synchronization signal is greater than the threshold value, the terminal suspends transmitting synchronization in the transmission frame of the transmission-observation alternation period at step 2020 as shown in FIG. 9A. If the reception power of the synchronization signal is not greater than the threshold value, the terminal transmits its synchronization signal in the transmission frame of the transmission-observation alternation period at step 2030.

Figure 21:
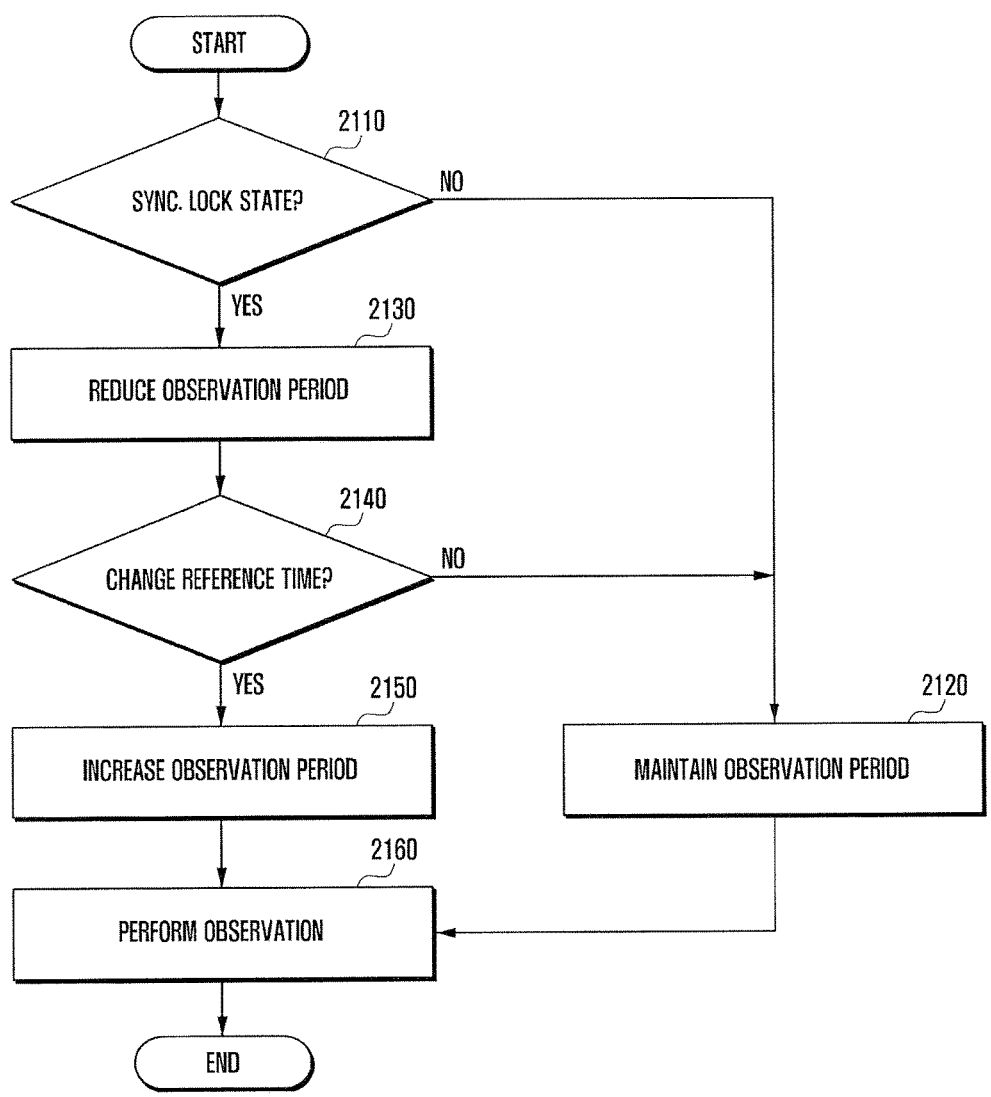
FIG. 21 is a flowchart illustrating an observation period reduction procedure of a synchronization method according to an exemplary embodiment of the present invention.

FIG. 21 is a flowchart illustrating an observation period reduction procedure of a synchronization method according to an exemplary embodiment of the present invention.

Referring to FIG. 21, the terminal determines whether it is in the synchronization lock state at step 2110. If it is in the synchronization lock state, the terminal reduces the observation period as described with reference to FIG. 10 at step 2130. In other cases, the terminal maintains the current observation period (whole frame) at step 2120.

In the state that the observation period has been reduced, the terminal determines whether the reference time of the neighbor synchronization signal has been changed at step 2140. For example, the neighbor terminal is capable of transmitting the synchronization signal with a distinct sequence or notifies of the reference time change of the synchronization signal without transmission of the synchronization signal. If the reference time of the neighbor synchronization signal has changed, the terminal increases the observation period to the whole frame at step 2150. Next, the terminal performs observation in the configured observation period at step 2160. If the reference time of the neighbor synchronization signal has not changed, the terminal maintains the reduced observation period at step 2120.

Figure 22:
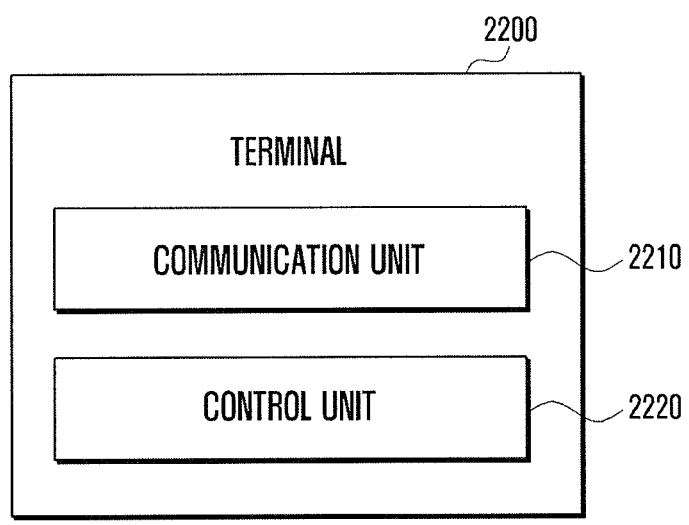
FIG. 22 is a block diagram illustrating a configuration of a terminal according to an exemplary embodiment of the present invention.

FIG. 22 is a block diagram illustrating a configuration of a terminal according to an exemplary embodiment of the present invention.

Referring to FIG. 22, a communication unit 2210 of terminal 2200 is responsible for D2D communication with neighbor terminals. In an exemplary embodiment of the present invention, the communication unit 2210 is capable of transmitting and receiving a synchronization signal to and from the neighbor terminals. A control unit 2220 controls the communication unit 2210 to transmit and receive signals. In an exemplary embodiment of the present invention, the control unit 2220 determines whether to transmit/receive the synchronization signal and controls transmitting/receiving the control signal depending on the determination result.

As described above, an exemplary synchronization apparatus and method of the present invention is advantageous in that the terminal is capable of acquiring synchronization with assistance of infrastructure such as base station and Access Point (AP).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the exemplary embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed exemplary embodiments incorporating the spirit and substance of the invention may occur to persons skilled in the art, the invention should be construed to include everything within the scope of the appended claims and equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A synchronization method of a first terminal, the method comprising:
   identifying a first reception time at which a first synchronization signal is received from a second terminal, in an initial observation period;
   configuring a first reference time based on a predetermined frame length by using a position of the first reception time in the initial observation period;
   determining a second synchronization signal having a maximum transmission power level among a plurality of synchronization signals received from a plurality of terminals, in a reception period following the initial observation period, the second synchronization signal being received at a second reference time in the reception period;
   comparing the first reference time with the second reference time, the second reference time being determined based on the predetermined frame length by using a position of the second reception time in the reception period;
   updating the first reference time to the second reference time for the synchronization, when the second reference time precedes the first reference time, based on the compared result; and
   transmitting a third synchronization signal based on the first reference time or the second reference time based on whether the first reference time is updated to the second reference time, to at least one terminal, in a transmission period following the initial observation period.

2. The method of claim 1, further comprising:
   determining whether the first terminal is in a synchronization lock state;
   determining, if the first terminal is in the synchronization lock state, whether a neighbor synchronization signal having a neighbor reference time different from the second reference time over a predetermined interval is received;
   determining, if the neighbor synchronization signal is received, whether the neighbor synchronization signal indicates the synchronization lock state;
   determining, if the neighbor synchronization signal indicates the synchronization lock state, whether the neighbor reference time is earlier than the second reference time of the first terminal; and
   updating, if the neighbor reference time is earlier than the second reference time of the first terminal, the second reference time according to the neighbor synchronization signal.

3. The method of claim 2, further comprising increasing, if the neighbor synchronization signal is not received, the transmission period to be longer than the reception period in an alternation period.

4. The method of claim 1, further comprising:
   determining whether a power of the second synchronization signal is greater than a predetermined threshold; and
   suspending, if the power of the second synchronization signal is greater than the threshold, transmission of the third synchronization signal in the transmission period.

5. The method of claim 4, further comprising restarting, if the power of the second synchronization signal is equal to or less than the threshold, the transmission of the third synchronization signal in the transmission period.

6. The method of claim 3, further comprising observing, if the first terminal is in the synchronization lock state, a fourth synchronization signal in a predetermined period around the second reference time of the first terminal which is shorter than the reception period of the alternation period.

7. The method of claim 6, further comprising observing, if no synchronization signal is received in a predetermined period around the second reference time of the first terminal or if the fourth synchronization signal indicates change of the reference signal, the fourth synchronization signal in a whole reception period.

8. A first terminal for performing synchronization, the first terminal comprising:
a communication transceiver configured to transmit and receive synchronization signals; and
at least one processor configured to:
identify a first reception time at which a first synchronization signal is received from a second terminal, in an initial observation period,
control configuring a first reference time based on a predetermined frame length by using a position of the first reception time in the initial observation period,
determine a second synchronization signal having a maximum transmission power level among a plurality of synchronization signals received from a plurality of terminals in a reception period following the initial observation period, the second synchronization signal being received at a second reference time in the reception period,
compare the first reference time with the second reference time, the second reference time being determined based on the predetermined frame length by using a position of the second reception time in the reception period,
update the first reference time to the second reference time for the synchronization, when the second reference time precedes the first reference time, based on the compared result, and
transmit a third synchronization signal based on the first reference time or the second reference time based on whether the first reference time is updated to the second reference time, to at least one terminal in a transmission period following the initial observation period.

9. The first terminal of claim 8, wherein the at least one processor is further configured to:
control determining whether the first terminal is in a synchronization lock state,
determine, if the first terminal is in the synchronization lock state, whether a neighbor synchronization signal having a neighbor reference time different from the second reference time over a predetermined interval is received,
determine, if the neighbor synchronization signal is received, whether the neighbor synchronization signal indicates the synchronization lock state,
determine, if the neighbor synchronization signal indicates the synchronization lock state, whether the neighbor reference time is earlier than the second reference time, and
update, if the neighbor reference time is earlier than the second reference time of the terminal, the second reference time according to the neighbor synchronization signal.

10. The first terminal of claim 9, wherein the at least one processor is further configured to increase, if the neighbor synchronization signal is not received, the transmission period to be longer than the reception period in an alternation period.

11. The first terminal of claim 8, wherein the at least one processor is further configured to:
determine whether a power of the second synchronization signal is greater than a predetermined threshold, and
suspend, if the power of the second synchronization signal is greater than the threshold, transmission of the third synchronization signal in the transmission period.

12. The first terminal of claim 11, wherein the at least one processor is further configured to restart, if the power of the second synchronization signal is equal to or less than the threshold, the transmission of the third synchronization signal in the transmission period.

13. The third terminal of claim 10, wherein the at least one processor is further configured to observe, if the first terminal is in the synchronization lock state, a fourth synchronization signal in a predetermined period around the second reference time of the first terminal which is shorter than the reception period of the alternation period.

14. The first terminal of claim 13, wherein the at least one processor is further configured to observe, if no synchronization signal is received in a predetermined period around the second reference time of the first terminal or if the fourth synchronization signal indicates change of the reference signal, the fourth synchronization signal in a whole reception period.

15. A non-transitory computer-readable medium for storing instructions that, if executed, cause at least one processor to perform the method of claim 1.

16. The method of claim 1, wherein the reception period and the transmission period alternate with each other.

17. The first terminal of claim 13, wherein the reception period and the transmission period alternate with each other.

* * * * *